United States Patent
Maeda et al.

(10) Patent No.: US 7,418,436 B2
(45) Date of Patent: Aug. 26, 2008

(54) INFORMATION PROCESSING APPARATUS, MEMORY MANAGEMENT APPARATUS, MEMORY MANAGEMENT METHOD, AND INFORMATION PROCESSING METHOD

(75) Inventors: Akiyoshi Maeda, Sanda (JP); Takayoshi Okazaki, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 222 days.

(21) Appl. No.: 10/473,818

(22) PCT Filed: Jan. 31, 2003

(86) PCT No.: PCT/JP03/00991

§ 371 (c)(1),
(2), (4) Date: Oct. 2, 2003

(87) PCT Pub. No.: WO03/065210

PCT Pub. Date: Aug. 7, 2003

(65) Prior Publication Data

US 2004/0139310 A1    Jul. 15, 2004

(30) Foreign Application Priority Data

Jan. 31, 2002    (JP)    ............................. 2002-024497

(51) Int. Cl.
*G06F 17/30* (2006.01)
(52) U.S. Cl. ......................................... 707/1; 707/200
(58) Field of Classification Search .................... 707/1, 707/100, 10, 101, 102, 200, 202, 203, 204, 707/205; 711/100, 170
See application file for complete search history.

(56) References Cited

U.S. PATENT DOCUMENTS

| | | | |
|---|---|---|---|
| 5,579,502 A | | 11/1996 | Konishi et al. |
| 5,611,067 A | | 3/1997 | Okamoto et al. |
| 5,644,539 A | | 7/1997 | Yamagami et al. |
| 5,701,492 A | | 12/1997 | Wadsworth et al. |
| 5,813,009 A | * | 9/1998 | Johnson et al. ............. 707/100 |
| 5,838,614 A | | 11/1998 | Estakhri et al. |
| 5,845,313 A | | 12/1998 | Estakhri et al. |

(Continued)

FOREIGN PATENT DOCUMENTS

EP            0 528 280            2/1993

(Continued)

*Primary Examiner*—Don Wong
*Assistant Examiner*—Marc R Filipczyk
(74) *Attorney, Agent, or Firm*—Wenderoth, Lind & Ponack, L.L.P.

(57) ABSTRACT

It is an object to provide an information processing apparatus and a memory management method, which realize highly reliable writing and reading of data into/from a serial flash memory, and reduce the execution time of a CPU by booting at power-on. An information processing apparatus is composed of a memory management unit for storing files, and an information processing unit for performing processing on the basis of a program file supplied from the memory management unit, and the memory management unit is composed of a file flash for storing files, a file management unit for managing the files stored in the file flash, a work memory as a work area of the information processing unit, a flash I/F 12 for making access from the file management unit to the file flash, and a boot flash for storing a boot program.

32 Claims, 25 Drawing Sheets

U.S. PATENT DOCUMENTS

| | | | |
|---|---|---|---|
| 5,890,188 A | 3/1999 | Okamoto et al. | |
| 5,907,856 A | 5/1999 | Estakhri et al. | |
| 5,924,113 A | 7/1999 | Estakhri et al. | |
| 5,930,815 A | 7/1999 | Estakhri et al. | |
| 5,953,737 A | 9/1999 | Estakhri et al. | |
| 6,081,878 A | 6/2000 | Estakhri et al. | |
| 6,115,785 A | 9/2000 | Estakhri et al. | |
| 6,122,195 A | 9/2000 | Estakhri et al. | |
| 6,125,435 A | 9/2000 | Estakhri et al. | |
| 6,128,695 A | 10/2000 | Estakhri et al. | |
| 6,130,837 A | 10/2000 | Yamagami et al. | |
| 6,145,051 A | 11/2000 | Estakhri et al. | |
| 6,151,247 A | 11/2000 | Estakhri et al. | |
| 6,172,906 B1 | 1/2001 | Estakhri et al. | |
| 6,202,138 B1 | 3/2001 | Estakhri et al. | |
| 6,223,308 B1 | 4/2001 | Estakhri et al. | |
| 6,230,234 B1 | 5/2001 | Estakhri et al. | |
| 6,341,085 B1 | 1/2002 | Yamagami et al. | |
| 6,397,314 B1 | 5/2002 | Estakhri et al. | |
| 6,411,546 B1 | 6/2002 | Estakhri et al. | |
| 6,587,382 B1 | 7/2003 | Estakhri et al. | |
| 6,687,687 B1 * | 2/2004 | Smadja | 707/2 |
| 6,728,851 B1 | 4/2004 | Estakhri et al. | |
| 6,757,800 B1 | 6/2004 | Estakhri et al. | |
| 6,801,979 B1 | 10/2004 | Estakhri et al. | |
| 2001/0021965 A1 * | 9/2001 | Yokota et al. | 711/163 |
| 2001/0029564 A1 | 10/2001 | Estakhri et al. | |
| 2001/0030890 A1 | 10/2001 | Yamagami et al. | |
| 2002/0085416 A1 | 7/2002 | Yamagami et al. | |
| 2002/0085433 A1 * | 7/2002 | Tomori et al. | 365/200 |
| 2003/0210587 A1 | 11/2003 | Yamagami et al. | |
| 2004/0117586 A1 | 6/2004 | Estakhri et al. | |
| 2004/0199714 A1 | 10/2004 | Estakhri et al. | |
| 2004/0208060 A1 | 10/2004 | Yamagami et al. | |
| 2004/0225827 A1 * | 11/2004 | Yokota et al. | 711/103 |
| 2005/0055497 A1 | 3/2005 | Estakhri et al. | |
| 2005/0162899 A1 | 7/2005 | Yamagami et al. | |
| 2005/0162900 A1 | 7/2005 | Yamagami et al. | |
| 2005/0162901 A1 | 7/2005 | Yamagami et al. | |
| 2005/0162902 A1 | 7/2005 | Yamagami et al. | |
| 2005/0166088 A1 | 7/2005 | Yamagami et al. | |
| 2005/0169045 A1 | 8/2005 | Yamagami et al. | |
| 2005/0273551 A1 * | 12/2005 | Keays | 711/103 |

FOREIGN PATENT DOCUMENTS

| | | |
|---|---|---|
| EP | 0 548 564 | 6/1993 |
| JP | 56-21252 | 2/1981 |
| JP | 58-107976 | 6/1983 |
| JP | 61-72321 | 4/1986 |
| JP | 1-248358 | 10/1989 |
| JP | 3-81842 | 4/1991 |
| JP | 0 528 280 | 2/1993 |
| JP | 5-46490 | 2/1993 |
| JP | 7-78231 | 3/1995 |
| JP | 7-281951 | 10/1995 |
| JP | 11-282765 | 10/1999 |
| JP | 2001-249855 | 9/2001 |
| JP | 2002-7179 | 1/2002 |

* cited by examiner

INFORMATION PROCESSING APPARATUS, MEMORY MANAGEMENT APPARATUS, MEMORY MANAGEMENT METHOD, AND INFORMATION PROCESSING METHOD

FIELD OF THE INVENTION

The present invention relates to an information processing apparatus, memory management apparatus, memory management method, and information processing apparatus for managing data of files stored in a storage means without degrading reliability of data.

BACKGROUND ART

A digital household electrical appliance such as a DVD has a storage unit using a flash memory for the purposes of holding a program for operating the equipment, storing processed data, and the like.

Flash memories are classified into serial flash memories such as NAND type flash memories and AND type flash memories, and NOR type flash memories, depending on the constructions of storage elements.

Among these flash memories, the NOR type flash memory is a highly reliable memory which has a low probability of defects occurring in writing or reading operation. Further, it can be directly accessed by a CPU, resulting in high reading speed and suitability for random access, and accordingly, it is often used as a memory for holding a program.

On the other hand, a serial flash memory has a relatively small size of a memory cell, i.e., about one-third of that of the NOR type flash memory. Further, it is highly integrated as well as has high erasing and writing speeds, i.e., it has an erasing time about one-hundredth of that of the NOR type flash memory and a writing time about one-twentieth of that of the NOR type flash memory.

However, a serial flash memory cannot be directly accessed by a CPU, and it has a relatively high probability of defects occurring in writing or reading operation. Therefore, such serial flash memory is utilized when storing data for which highly precise reading and writing are not required, as in cases when storing stream data having temporal continuity such as moving picture data and audio data.

From these functions and characteristics, in a conventional information processing apparatus for controlling the operations of conventional digital household electrical appliances, the NOR type flash memory is employed as a memory for holding a program. An information processing apparatus with a NOR type flash memory generally has a construction shown in FIG. 28. Hereinafter, the construction and operation will be described with reference to FIG. 28.

With reference to FIG. 28, a conventional information processing apparatus 100*d* has an information processing unit 30, a work memory 14 for holding variables, a NOR type flash 21 for holding a program, and an information saving unit 22 for saving information during power-down.

The work memory 14 is implemented by a SDRAM (Synchronous Dynamic Random Access Memory).

The NOR type flash 21 supplies stored data to the information processing unit 30 in response to an access from the information processing unit 30. Further, in response to an access from the information processing unit 30, it performs erasing of the stored data or storage of supplied data.

The information saving unit 22 is implemented by a SRAM (Static Random Access Memory) for holding management information such as operating states or disk writing addresses, which are supplied from the information processing unit 30. Because the SRAM has a relatively low power consumption, it can prevent the data stored in the SRAM from being erased even when the power is turned off, by using a backup battery. The information saving unit 22 holds the data without giving changes thereto until an erase/rewrite command is supplied from the information processing unit 30.

Next, the operation of the information processing apparatus 100*d* constructed as above will be described.

When power is applied to the information processing apparatus 100*d*, the information processing unit 30 reads out a variable stored in the information saving unit 22, and transmits the variable to the work memory 14. Then, the information processing unit 30 reads the program stored in the NOR type flash 21 for every step, and successively executes processing according to a command described in the program. When the variable varies, the information processing unit 30 rewrites the variable in the work memory 14. Further, the information processing unit 30 periodically performs, while executing the processing, back-up of the variable by storing the variable to the information saving unit 22. At turning off the power, the information processing unit 30 writes the status immediately before the turning-off of the power into the information saving unit 22.

However, because the memory capacity of the NOR type flash is about 32 Mbit at the maximum, it is becoming harder to store a program of a digital household electrical appliance in a single memory as the size of the program increases. On the other hand, providing plural NOR type flashes leads to an increase in the number of parts, resulting in an increased footprint as well as an increased manufacturing cost.

Further, the SRAM needs a backup power supply in order to retain the management information and the data immediately before turning off the power, even after the power is turned off. Therefore, the conventional digital household electrical appliances have circuits for continuously supplying power to the SRAM by a commercially available coin-shaped lithium battery or a rechargeable battery that is charged during power-on, resulting in a further increase in footprint. Moreover, since the SRAM itself is expensive, back up of management information that does not employ a SRAM is desired.

Furthermore, in the conventional information processing apparatus 100*d*, the information processing unit 30 reads a program from the NOR type flash 21, for every step, to execute processing, resulting in an extended execution time.

The present invention is made to solve the above-described problems and has for its object to provide an information processing apparatus, a memory management apparatus, a memory management method, and an information processing method, which can perform writing or reading of data into/from a serial flash memory having a large capacity with occurring no defects, and can reduce the CPU execution time by performing booting at power-on.

SUMMARY OF THE INVENTION

In order to solve the above-described problems, according to a first aspect of the present invention, there is provided an information processing apparatus having a memory management unit for managing files, and a processing unit for executing processing of a program on the basis of a program file supplied from the memory management unit, wherein the memory management unit comprises: a main storage means for storing the program file and various kinds of files, first management information describing information of all of the stored files, and second management information for backing up the first management information; a boot program storage means for storing a boot program to be used at boot-up; an auxiliary storage means for storing a supplied file; a file management means for making access to the main storage means, the boot program storage means, and the auxiliary storage means; and the file management means transferring, at boot-up, the first management information and the second management information to the auxiliary storage means on the basis of the boot program that is read from the boot program storage means, and transferring the file stored in the main storage means to the auxiliary storage means on the basis of the transferred first management information; and the processing unit reads the program file transferred to the auxiliary storage means, and executing the processing of the program thereof.

According to a second aspect of the present invention, there is provided an information processing apparatus having a memory management unit for managing files, and a processing unit for executing processing of a program on the basis of a program file supplied from the memory management unit, wherein the memory management unit comprises: a main storage means for holding a first program file and various kinds of files, first management information describing information of all of the stored files, and second management information for backing up the first management information; a communication means for obtaining a second program file from the outside of the apparatus; an auxiliary storage means for storing a supplied file; a boot program storage means for storing a boot program to be used at boot-up; a file management means for making access to the main storage means and the auxiliary storage means; a setting means for setting processing at boot-up; a first transfer means for transferring the first management information and the second management information to the auxiliary storage means on the basis of the boot program that is read from the boot program storage means, and transferring the first program file stored in the main storage means to the auxiliary storage means; and a second transfer means for transferring the first management information and the second management information to the auxiliary storage means on the basis of the boot program that is read from the boot program storage means, and transferring the second program file obtained through the communication means to the auxiliary storage means; and said memory management unit selecting, at boot-up, either the first transfer means or the second transfer means on the basis of the setting by the setting means to perform transfer of the program file to the auxiliary storage means; and said processing unit reads the program file transferred to the auxiliary storage means, and executing the processing of the program thereof.

According to a third aspect of the present invention, in the information processing apparatus defined in the second aspect, the memory management unit further comprises: a data storage device for accumulating and storing a third program file and data supplied thereto; and a third transfer means for transferring the first management information and the second management information to the auxiliary storage means on the basis of the boot program read from the boot program storage means, and transferring the third program file stored in the data storage device to the auxiliary storage means; and the memory management unit selects, at boot-up, one of the first transfer means, the second transfer means, and the third transfer means on the basis of the setting by the setting means to transfer the program file to the auxiliary storage means.

According to a fourth aspect of the present invention, in the information processing apparatus defined in the second or third aspect, the processing unit obtains a file from an external apparatus through the communication means.

According to a fifth aspect of the present invention, in the information processing apparatus defined in the third aspect, the file management means stores a file generated in the processing apparatus to the data storage device.

According to a sixth aspect of the present invention, in the information processing apparatus defined in any of the second to fifth aspect, the file management means outputs a file generated in the processing apparatus to the outside through the communication means.

According to a seventh aspect of the present invention, in the information processing apparatus defined in any of the first to sixth aspects, the file management means stores a file generated in the processing apparatus into the main storage means.

According to an eighth aspect of the present invention, in the information processing apparatus as defined in any of the first to seventh aspects, the main storage means is a serial flash memory.

According to a ninth aspect of the present invention, in the information processing apparatus defined in the eighth aspect, the main storage means comprises a serial flash memory containing the management information and various kinds of files, and at least one serial flash memory containing various kinds of files.

According to a tenth aspect of the present invention, in the information processing apparatus defined in the eighth aspect, the main storage means comprises a serial flash memory containing the management information, and at least one serial flash memory containing various kinds of files.

According to an eleventh aspect of the present invention, in the information processing apparatus defined in the eighth aspect, the main storage means comprises plural serial flash memories each containing the management information and various kinds of files.

According to a twelfth aspect of the present invention, there is provided a memory management apparatus comprising: a main storage means for storing files, and first management information and second management information which describe information of all of the stored files; a management information generation means for generating new management information for performing erasing and writing from/into the main storage means; a first management information updating means for updating the contents of the first management information stored in the main storage means by the contents of the new management information; a storage processing means for performing erasing and writing from/into the main storage means on the basis of the new management information; and a second management information updating means for updating the contents of the second management information stored in the main storage means by the contents of the new management information.

According to a thirteenth aspect of the present invention, in the memory management apparatus defined in the twelfth aspect, the new management information generated by the management information generation means includes: information of a new file to be added and information of an old file to be erased at updating the file stored in the main storage means, information of a block into which new data to be added is to be written and information of a block in which old data to be erased is stored at updating a block stored in the main storage means, information of a file to be added at adding a new file into the main storage means; and information of a file to be erased at erasing a file from the storage means.

According to a fourteenth aspect of the present invention, in the memory management apparatus defined in the twelfth or thirteenth aspect, the main storage means has a processing state indication area indicating a processing state.

According to a fifteenth aspect of the present invention, in the memory management apparatus defined in the fourteenth aspect, the processing state indicating area comprises: an end-of-writing indication area indicating that writing into a predetermined area has ended, an operating state indication area indicating various kinds of states that occur during erasing or writing from/into a predetermined area, and a disablement indication area indicating that a predetermined area cannot be used.

According to a sixteenth aspect of the present invention, in the memory management apparatus defined in the fifteenth aspect, the main storage means comprises plural blocks each comprising a predetermined number of pages, and the end-of-writing indication area comprises: an end-of-page-writing indication area which is provided in each page, and indicates that writing into the corresponding page has ended, and an end-of-block-writing indication area which is provided in a predetermined page in each block, or over plural pages starting from a predetermined page, and indicates that writing into the corresponding block has ended.

According to a seventeenth aspect of the present invention, in the memory management apparatus defined in the sixteenth aspect, the storage processing means overwrites an end-of-writing indication into the end-of-page-writing indication area when the writing into the page has ended, and overwrites the same into the end-of-block-writing indication area when the writing into the block has ended.

According to an eighteenth aspect of the present invention, in the memory management apparatus defined in the fifteenth aspect, the main storage means comprises plural blocks each comprising a predetermined number of pages; and every time the storage processing means performs erasing or writing from/into any area, the storage processing means overwrites a state indication indicating the state of the processing, on the operation state indication area in a predetermined page in a predetermined block, or on the operation state indication areas over plural pages starting from a predetermined page in a predetermined block.

According to a nineteenth aspect of the present invention, in the memory management apparatus defined in the eighteenth aspect, the state indication comprises: a first state indication indicating that the first management information is being erased, a second state indication indicating that the first management information is being updated, a third state indication indicating that a new file is being written, a fourth state indication indicating that an old file is being erased, a fifth state indication indicating that the second management information is being erased, a sixth state indication indicating the second management information is being updated, and a seventh state indication indicating that all of processings have completed.

According to a twentieth aspect of the present invention, in the memory management apparatus defined in the fifteenth or eighteenth aspect, the operation state indication area comprises: a first state indication area indicating that the first management information is being erased, a second state indication area indicating that the first management information is being updated, a third state indication area indicating that a new file is being written, a fourth state indication area indicating that an old file is being erased, a fifth state indication area indicating that the second management information is being erased, a sixth state indication area indicating that the second management information is being updated, and a seventh state indication area indicating that all of processings have completed.

According to a twenty-first aspect of the present invention, in the memory management apparatus defined in the fifteenth aspect, the main storage means comprises plural blocks each comprising a predetermined number of pages, and when a block goes into disable state, the storage processing means overwrites a disablement indication on the block disablement indication area in a predetermined page in the corresponding block, or on the block disablement indication areas over plural pages starting from a predetermined page in the corresponding block.

According to a twenty-second aspect of the present invention, the memory management apparatus defined in any of the fourteenth to twenty-first aspects further comprises an indication value acquisition means for dividing a value indicated in each of the processing state indication areas, for every predetermined number of bits, and assigning a binary value to each divided area by majority judgement, to obtain indication values in the respective areas.

According to a twenty-third aspect of the present invention, in the memory management apparatus defined in any of the fourteenth to twenty-first aspects, the memory management apparatus further comprises an indication value acquisition means for dividing a value indicated in each of the processing state indication areas, for every predetermined number of bits, and assigning a binary value to each divided value according to whether all of the bits are in a predetermined state or not, to obtain indication values in the respective areas.

According to a twenty-fourth aspect of the present invention, in the memory management apparatus defined in any of the sixteenth, eighteenth and twenty-first aspects, the memory management apparatus further comprises a block indication value acquisition means for performing majority judgement for block indication values in each page, which are obtained by dividing a value indicated in each page for every predetermined number of bits and assigning a binary value to each divided value, thereby to determine plural indication values as indication values as block indication values of the target block.

According to a twenty-fifth aspect of the present invention, in the memory management apparatus defined in any of the twelfth to twenty-fourth aspects, the main storage means is a serial flash memory.

According to a twenty-sixth aspect of the present invention, there is provided a memory management method for performing erasing and writing of files from/into a main storage means which has plural blocks containing data, and stores files and first management information and second management information in which information of all of the stored files are described, which method comprises: a management information generation step of generating new management information including information of a block into which new data is to be written, and information of a block from which old data is to be erased; a block writing step of writing the new data on the basis of the new management information; a first management information updating step of updating the first management information stored in the main storage means by the contents of the new management information; a second management information updating step of updating the second management information stored in the main storage means by the contents of the new management information; and a block erasing step of erasing the old data on the basis of the new management information.

According to a twenty-seventh aspect of the present invention, there is provided a memory management method for managing erasing and writing of files from/into a main storage means which stores files and first management information and second management information in which information of all of the stored files are described, which method comprises: a management information generation step of generating new management information including information of a new file to be added and information of an old file to be erased; a first management information updating step of updating the first management information stored in the main storage means by the contents of the new management information; a file updating step of writing the new file on the basis of the new management information, and erasing the old file on the basis of the new management information; and a second management information updating step of updating the second management information stored in the main storage means by the contents of the new management information.

According to a twenty-eighth aspect of the present invention, there is provided a memory management method for managing writing of files into a main storage means which stores files and first management information and second management information in which information of all files stored are described, and the method comprises: a management information generation step of generating new management information including information of a new file to be added; a first management information updating step of updating the first management information stored in the main storage means by the contents of the new management information; a file writing step of writing the file on the basis of the new management information; and a second management information updating step of updating the second management information stored in the main storage means by the contents of the new management information.

According to a twenty-ninth aspect of the present invention, in the memory management method defined in any of the twenty-sixth to twenty-eighth aspects, the main storage means has a data storage area which comprises plural blocks containing data, and stores files, which method further comprises: a disablement indication step of, when a block becomes disable in the block writing step, or the file updating step, or the file writing step, overwriting a disablement indication indicating that the block is a disable block into a predetermined area in the disable block; a rewriting step of rewriting the contents to be written in the disable block, into an alternative block that is available in the data storage area; and a correction management information updating step of updating the first management information and the second management information which are stored in the main storage means, by the contents of correction management information including information of the disable block and the alternative block.

According to a thirtieth aspect of the present invention, there is provided a memory management method for managing erasing of a file from a main storage means which stores files and first management information and second management information in which information of all of the stored files are described, and the method comprises: a management information generation step of generating new management information including information of a file to be erased; a first management information updating step of updating the first management information stored in the main storage means by the contents of the new management information; a file erasing step of erasing the file on the basis of the new management information; and a second management information updating step of updating the second management information stored in the main storage means by the contents of the new management information.

According to a thirty-first aspect of the present invention, in the memory management method defined in the thirtieth aspect, the main storage means comprises plural blocks containing data, and the method further comprises: a disablement indication step of, when a block becomes disable in the file erasing step, overwriting a disablement indication indicating that the block is a disable block, into a predetermined area of the disable block; and a correction management information updating step of updating the first management information and the second management information stored in the main storage means by the contents of correction management information including information of the disable block.

According to a thirty-second aspect of the present invention, in the memory management method defined in any of the twenty-sixth to twenty-eighth and thirtieth aspects, the main storage means has a management information storage area which comprises plural blocks containing data, and stores first management information and second management information, and the method further comprises: a disablement indication step of, when a block becomes disable in the first management information updating step or the second management information updating step, overwriting a disablement indication indicating that the block is a disable block, into a predetermined area in the disable block; and a management information rewriting step of rewriting the new management information into an alternative block that is available in the management information storage area.

According to a thirty-third aspect of the present invention, there is provided an information processing method employing an information processing apparatus which includes a memory management unit for managing files, and a processing unit for executing processing of a program on the basis of a program file supplied from the memory management unit, wherein the memory management unit comprises: a main storage means for storing the program file and various kinds of files, first management information describing information of all of the stored files, and second management information for backing up the first management information; a boot program storage means for storing a boot program to be used at boot-up; an auxiliary storage means for storing files supplied thereto; and a file management means for making access to the main storage means, the boot program storage means, and the auxiliary storage means; and the information processing unit transfers, at boot-up, the first management information and the second management information to the auxiliary storage means on the basis of the boot program that is read from the boot program storage means by the file management means, transfers the file stored in the main storage means to the auxiliary storage means on the basis of the transferred first management information, and reads the program file transferred to the auxiliary storage means by the processing unit, and executes the processing of the program thereof.

As described above, according to the first aspect of the present invention, there is provided an information processing apparatus having a memory management unit for managing files, and a processing unit for executing processing of a program on the basis of a program file supplied from the memory management unit, wherein the memory management unit comprises: a main storage means for storing the program file and various kinds of files, first management information describing information of all of the stored files, and second management information for backing up the first management information; a boot program storage means for storing a boot program to be used at boot-up; an auxiliary storage means for storing a supplied file; a file management means for making access to the main storage means, the boot program storage means, and the auxiliary storage means; and the file management means transferring, at boot-up, the first management information and the second management information to the auxiliary storage means on the basis of the boot program that is read from the boot program storage means, and transferring the file stored in the main storage means to the auxiliary storage means on the basis of the transferred first management information; and the processing unit reads the program file transferred to the auxiliary storage means, and executing the processing of the program thereof. Therefore, it is not necessary for the processing unit to read the program, for every step, from the main storage unit when executing the processing. Thereby, the processing speed of the processing unit is increased, resulting in a significant reduction in the execution time.

According to the second aspect of the present invention, there is provided an information processing apparatus having a memory management unit for managing files, and a processing unit for executing processing of a program on the basis of a program file supplied from the memory management unit, wherein the memory management unit comprises: a main storage means for holding a first program file and various kinds of files, first management information describing information of all of the stored files, and second management information for backing up the first management information; a communication means for obtaining a second program file from the outside of the apparatus; an auxiliary storage means for storing a supplied file; a boot program storage means for storing a boot program to be used at boot-up; a file management means for making access to the main storage means and the auxiliary storage means; a setting means for setting processing at boot-up; a first transfer means for transferring the first management information and the second management information to the auxiliary storage means on the basis of the boot program that is read from the boot program storage means, and transferring the first program file stored in the main storage means to the auxiliary storage means; and a second transfer means for transferring the first management information and the second management information to the auxiliary storage means on the basis of the boot program that is read from the boot program storage means, and transferring the second program file obtained through the communication means to the auxiliary storage means; and said memory management unit selects, at boot-up, either the first transfer means or the second transfer means on the basis of the setting by the setting means to perform transfer of the program file to the auxiliary storage means; and said processing unit reads the program file transferred to the auxiliary storage means, and executing the processing of the program thereof. Therefore, various kinds of programs such as a self-diagnosis program and a main program can be selected and executed. Further, because the information processing apparatus can carry out self-diagnosis, various kinds of jigs that have conventionally been required for diagnosis become unnecessary, whereby such jigs for maintenance and check are not required to be held for long hours.

According to the third aspect of the present invention, in the information processing apparatus defined in the second aspect, the memory management unit further comprises: a data storage device for accumulating and storing a third program file and data supplied thereto; and a third transfer means for transferring the first management information and the second management information to the auxiliary storage means on the basis of the boot program read from the boot program storage means, and transferring the third program file stored in the data storage device to the auxiliary storage means; and the memory management unit selects, at boot-up, one of the first transfer means, the second transfer means, and the third transfer means on the basis of the setting by the setting means to transfer the program file to the auxiliary storage means. Therefore, various kinds of programs such as a self-diagnosis program and a main program can be selected and executed, and the various kinds of programs can be obtained from the data storage device. Further, because the information processing apparatus can carry out self-diagnosis, various kinds of jigs that have conventionally been required for diagnosis become unnecessary, whereby such jigs for maintenance services are not required to be held for long hours.

According to the fourth aspect of the present invention, in the information processing apparatus defined in the second or third aspect, the processing unit obtains a file from an external apparatus through the communication means. Therefore, version-up of software or addition of a new function can be easily carried out by obtaining a new program file. Further, because it is possible to easily obtain files from the outside, the number of files to be stored in the main storage means can be reduced, and the main storage means having a smaller capacity results in a reduction in manufacturing cost.

According to the fifth aspect of the present invention, in the information processing apparatus defined in the third aspect, the file management means stores a file generated in the processing apparatus to the data storage device. Therefore, a self-diagnosis result file generated by executing a self-diagnosis program, usage history and malfunction history of the information processing apparatus, and the like can be stored in the data storage device. Further, degradations and the like which occur in the information processing apparatus and in devices connected to the information processing apparatus can be monitored using the self-diagnosis result file.

According to a sixth aspect of the present invention, in the information processing apparatus defined in any of the second to fifth aspects, the file management means outputs a file generated in the processing apparatus to the outside through the communication means. Therefore, various kinds of operation results such as a result of self-diagnosis can be monitored from the outside.

According to the seventh aspects of the present invention, in the information processing apparatus defined in any of the first to sixth aspects, the file management means stores a file generated in the processing apparatus into the main storage means. Therefore, various kinds of operation results such as a result of self-diagnosis can be stored in the main storage means. Further, degradations and the like that occur in the information processing apparatus and in devices connected to the information processing apparatus can be monitored using the self-diagnosis result file.

According to the eighth aspect of the present invention, in the information processing apparatus as defined in any of the first to seventh aspects, the main storage means is a serial flash memory. Therefore, erasing and writing from/into the main storage means can be carried out at high speed, and moreover, program files and data files having large data sizes can be stored in the main storage means.

According to the ninth aspect of the present invention, in the information processing apparatus defined in the eighth aspect, the main storage means comprises a serial flash memory containing the management information and various kinds of files, and at least one serial flash memory containing various kinds of files. Therefore, the main storage means can deal with increases in sizes of the program file and the various kinds of files. Further, because the capacities of the respective serial flash memories can be made different from each other, serial flashes having optimum capacities for the sizes of the program file and the various kinds of files can be used, resulting in a reduction in footprint and a reduction in manufacturing cost.

According to the tenth aspect of the present invention, in the information processing apparatus defined in the eighth aspect, the main storage means comprises a serial flash memory containing the management information, and at least one serial flash memory containing various kinds of files. Therefore, the main storage means can deal with increases in sizes of the program file and the various kinds of files. Further, because the capacities of the respective serial flash memories can be made different from each other, serial flashes having optimum capacities for the sizes of the program file and the various kinds of files can be used, resulting in a reduction in footprint and a reduction in manufacturing cost.

According to the eleventh aspect of the present invention, in the information processing apparatus defined in the eighth aspect, the main storage means comprises plural serial flash memories each containing the management information and various kinds of files. Therefore, the serial flashes can be replaced.

According to the twelfth aspect of the present invention, there is provided a memory management apparatus comprising: a main storage means for storing files, and first management information and second management information which describe information of all of the stored files; a management information generation means for generating new management information for performing erasing and writing from/into the main storage means; a first management information updating means for updating the contents of the first management information stored in the main storage means by the contents of the new management information; a storage processing means for performing erasing and writing from/into the main storage means on the basis of the new management information; and a second management information updating means for updating the contents of the second management information stored in the main storage means by the contents of the new management information. Therefore, areas in the main storage means which are to be targets of writing or erasing can be determined by the memory management apparatus. Further, because writing or erasing of files is carried out by the storage processing means after the first management information is written into the main storage means, the file in the middle of writing or erasing can be detected and erased by the memory management apparatus when the processing is interrupted before the storage processing means completes all of the processings. Furthermore, because the second management information is written after the first management information is written, the second management information can be recovered using the first management information when writing or erasing of the second management information is interrupted.

According to the thirteenth aspect of the present invention, in the memory management apparatus defined in the twelfth aspect, the new management information generated by the management information generation means includes: information of a new file to be added and information of an old file to be erased at updating the file stored in the main storage means, information of a block into which new data to be added is to be written and information of a block in which old data to be erased is stored at updating a block stored in the main storage means, information of a file to be added at adding a new file into the main storage means; and information of a file to be erased at erasing a file from the storage means. Therefore, the memory management apparatus can determine blocks which are to be targets of writing or erasing to perform writing and erasing into/from the blocks.

According to the fourteenth aspect of the present invention, in the memory management apparatus defined in the twelfth or thirteenth aspect, the main storage means has a processing state indication area indicating a processing state. Therefore, the memory management apparatus can grasp various states of the main storage means.

According to the fifteenth aspect of the present invention, in the memory management apparatus defined in the fourteenth aspect, the processing state indicating area comprises: an end-of-writing indication area indicating that writing into a predetermined area has ended, an operating state indication area indicating various kinds of states that occur in erasing or writing data from/into a predetermined area, and a disablement indication area indicating that a predetermined area cannot be used. Therefore, the memory management apparatus can grasp various states of the main storage means, and recover the file or block when processing for the file or block is interrupted.

According to the sixteenth aspect of the present invention, in the memory management apparatus defined in the fifteenth aspect, the main storage means comprises plural blocks each comprising a predetermined number of pages, and the end-of-writing indication area comprises: an end-of-page-writing indication area which is provided in each page, and indicates that writing into the corresponding page has ended, and an end-of-block-writing indication area which is provided in a predetermined page in each block, or over plural pages starting from a predetermined page, and indicates that writing into the corresponding block has ended. Therefore, the memory management apparatus can grasp as to whether writing into the areas is completed or not.

According to the seventeenth aspect of the present invention, in the memory management apparatus defined in the sixteenth aspect, the storage processing means overwrites an end-of-writing indication into the end-of-page-writing indication area when the writing into the page has ended, and overwrites the same into the end-of-block-writing indication area when the writing into the block has ended. Therefore, the memory management apparatus can grasp as to whether writing into the area is completed or not, and select a block into which no data is written, as a target block for next writing.

According to the eighteenth aspect of the present invention, in the memory management apparatus defined in the fifteenth aspect, the main storage means comprises plural blocks each comprising a predetermined number of pages; and every time the storage processing means performs erasing or writing from/into any area, the storage processing means overwrites a state indication indicating the state of the processing, on the operation state indication area in a predetermined page in a predetermined block, or on the operation state indication areas over plural pages starting from a predetermined page in a predetermined block. Therefore, the memory management apparatus can grasp the state of the processing performed to the area.

According to the nineteenth aspect of the present invention, in the memory management apparatus defined in the eighteenth aspect, the state indication comprises: a first state indication indicating that the first management information is being erased, a second state indication indicating that the first management information is being updated, a third state indication indicating that a new file is being written, a fourth state indication indicating that an old file is being erased, a fifth state indication indicating that the second management information is being erased, a sixth state indication indicating the second management information is being updated, and a seventh state indication indicating that all of processings have completed. Therefore, by grasping the state of the processing performed to the area, the memory management apparatus updates the contents of the first management information by the contents of the second management information when processing for the first management information is interrupted, or updates the contents of the second management information by the contents of the first management information when processing for the second management information is interrupted, thereby enabling recovering to the contents before the interruption of processing.

According to the twentieth aspect of the present invention, in the memory management apparatus defined in the fifteenth or eighteenth aspect, the operation state indication area comprises: a first state indication area indicating that the first management information is being erased, a second state indication area indicating that the first management information is being updated, a third state indication area indicating that a new file is being written, a fourth state indication area indicating that an old file is being erased, a fifth state indication area indicating that the second management information is being erased, a sixth state indication area indicating that the second management information is being updated, and a seventh state indication area indicating that all of processings have completed. Therefore, by grasping the state of the processing performed to the area, the memory management apparatus updates the contents of the first management information by the contents of the second management information when processing for the first management information is interrupted, or updates the contents of the second management information by the contents of the first management information when processing for the second management information is interrupted, thereby enabling recovering to the contents before the interruption of processing. Furthermore, when the areas indicating the states of various processings are made different from each other, the number of writings into the same area can be reduced, thereby keeping the durability of the main storage unit.

According to the twenty-first aspect of the present invention, in the memory management apparatus defined in the fifteenth aspect, the main storage means comprises plural blocks each comprising a predetermined number of pages, and when a block goes into disable state, the storage processing means overwrites a disablement indication on the block disablement indication area in a predetermined page in the corresponding block, or on the block disablement indication areas over plural pages starting from a predetermined page in the corresponding block. Therefore, the memory management apparatus can grasp whether the blocks are available or not, and select an available block, as a target block for next writing.

According to the twenty-second aspect of the present invention, the memory management apparatus defined in any of the fourteenth to twenty-first aspects further comprises an indication value acquisition means for dividing a value indicated in each of the processing state indication areas, for every predetermined number of bits, and assigning a binary value to each divided area by majority judgement, to obtain indication values in the respective areas. Therefore, even when false writing is made into the processing state indication area, the memory management apparatus can grasp the state presented by the value indicated.

According to the twenty-third aspect of the present invention, in the memory management apparatus defined in any of the fourteenth to twenty-first aspects, the memory management apparatus further comprises an indication value acquisition means for dividing a value indicated in each of the processing state indication areas, for every predetermined number of bits, and assigning a binary value to each divided value according to whether all of the bits are in a predetermined state or not, to obtain indication values in the respective areas. Therefore, only when false writing or garbled bits is not occurring in the processing state indication area, the memory management apparatus can grasp the state presented by the value indicated.

According to the twenty-fourth aspect of the present invention, in the memory management apparatus defined in any of the sixteenth, eighteenth and twenty-first aspects, the memory management apparatus further comprises a block indication value acquisition means for performing majority judgement for block indication values in each page, which are obtained by dividing a value indicated in each page for every predetermined number of bits and assigning a binary value to each divided value, thereby to determine plural indication values as indication values as block indication values of the target block. Therefore, even when false writing is made into the processing state indication area, the memory management apparatus can grasp the state presented by the value indicated.

According to the twenty-fifth aspects of the present invention, in the memory management apparatus defined in any of the twelfth to twenty-fourth aspects, the main storage means is a serial flash memory. Therefore, erasing or writing from/into the main storage means can be carried out at high speed, and moreover, program files and data files having large data sizes can be stored in the main storage means.

According to the twenty-sixth aspect of the present invention, there is provided a memory management method for performing erasing and writing from/into a main storage means which has plural blocks containing data, and stores files and first management information and second management information in which information of all of the stored files are stored, which method comprises: a management information generation step of generating new management information including information of a block into which new data is to be written, and information of a block from which old data is to be erased; a block writing step of writing the new data on the basis of the new management information; a first management information updating step of updating the first management information stored in the main storage means by the contents of the new management information; a second management information updating step of updating the second management information stored in the main storage means by the contents of the new management information; and a block erasing step of erasing the old data on the basis of the new management information. Therefore, an area in the main storage means to be a target of writing or erasing can be determined, and processing can be performed to the area.

According to the twenty-seventh aspect of the present invention, there is provided a memory management method for managing erasing and writing files from/into a main storage means which stores files and first management information and second management information in which information of all of the stored files are described, and the method comprises: a management information generation step of generating new management information including information of a new file to be added and information of an old file to be erased; a first management information updating step of updating the first management information stored in the main storage means by the contents of the new management information; a file updating step of writing the new file on the basis of the new management information, and erasing the old file on the basis of the new management information; and a second management information updating step of updating the second management information stored in the main storage means by the contents of the new management information. Therefore, an area in the main storage means to be a target of writing or erasing can be determined, and processing can be performed to the area. Further, because file updation is carried out after the first management information is written into the main storage means, the file in the middle of writing or erasing can be detected and erased when the processing is interrupted before all of the processings are completed. Furthermore, because the second management information is written after the first management information is written, the second management information can be recovered using the first management information when writing or erasing of the second management information is interrupted.

According to the twenty-eighth aspect of the present invention, there is provided a memory management method for managing writing of files into a main storage means which stores files and first management information and second management information in which information of all files stored are described, and the method comprises: a management information generation step of generating new management information including information of a new file to be added; a first management information updating step of updating the first management information stored in the main storage means by the contents of the new management information; a file writing step of writing the file on the basis of the new management information; and a second management information updating step of updating the second management information stored in the main storage means by the contents of the new management information. Therefore, an area in the main storage means to be a target of writing can be determined, and writing can be performed to the area. Further, because file writing is carried out after the first management information is written in the main storage means, the file in the middle of writing can be detected and erased when the processing is interrupted before all of the processings are completed. Furthermore, because the second management information is written after the first management information is written, the second management information can be recovered using the first management information when writing or erasing of the second management information is interrupted.

According to the twenty-ninth aspect of the present invention, in the memory management method defined in any of the twenty-sixth to twenty-eighth aspects, the main storage means has a data storage area which comprises plural blocks containing data, and stores files, which method further comprises: a disablement indication step of, when a block becomes disable in the block writing step, or the file updating step, or the file writing step, overwriting a disablement indication indicating that the block is a disable block, into a predetermined area in the disable block; a rewriting step of rewriting the contents to be written in the disable block, into an alternative block that is available in the data storage area; and a correction management information updating step of updating the first management information and the second management information which are stored in the main storage means, by the contents of correction management information including information of the disable block and the alternative block. Therefore, even when a defect occurs in a block as a target of updation, updation can be carried out using the alternative area. Further, since information about the position of the disable block is described in the first management information and the second management information, a block other than the disable block can be adopted as a target block for writing.

According to the thirtieth aspect of the present invention, there is provided a memory management method for managing erasing of a file from a main storage means which stores files and first management information and second management information in which information of all of the stored files are described, and the method comprises: a management information generation step of generating new management information including information of a file to be erased; a first management information updating step of updating the first management information stored in the main storage means by the contents of the new management information; a file erasing step of erasing the file on the basis of the new management information; and a second management information updating step of updating the second management information stored in the main storage means by the contents of the new management information. Therefore, an area in the main storage means to be a target of erasing can be determined, and erasing can be performed to the area. Further, because file updation is carried out after the first management information is written in the main storage means, the file in the middle of erasing can be detected and erased when the processing is interrupted before all of the processings are completed. Furthermore, because the second management information is written after the first management information is written, the second management information can be recovered using the first management information when writing or erasing of the second management information is interrupted.

According to the thirty-first aspect of the present invention, in the memory management method defined in the thirtieth aspect, the main storage means comprises plural blocks containing data, and the method further comprises: a disablement indication step of, when a block becomes disable in the file erasing step, overwriting a disablement indication indicating that the block is a disable block, into a predetermined area of the disable block; and a correction management information updating step of updating the first management information and the second management information stored in the main storage means by the contents of correction management information including information of the disable block. Therefore, even when a defect occurs in a block as a target of erasing, information about the position of the disable block can be described in the first management information and the second management information, and a block other than the disable block can be adopted as a target block at next writing.

According to the thirty-second aspect of the present invention, in the memory management method defined in any of the twenty-sixth to twenty-eighth and thirtieth aspect, the main storage means has a management information storage area which comprises plural blocks containing data, and stores first management information and second management information, and the method further comprises: a disablement indication step of, when a block becomes disable in the first management information updating step or the second management information updating step, overwriting a disablement indication indicating that the block is a disable block, into a predetermined area in the disable block; and a management information rewriting step of rewriting the new management information into an alternative block that is available in the management information storage area. Therefore, even when a defect occurs in a block to be updated, updation of the first management information and the second management information can be carried out using an alternative area. Further, since information of the position of the disable block is described in the first management information and the second management information, a block other than the disable block can be adopted as a target block at next writing.

According to the thirty-third aspect of the present invention, there is provided an information processing method employing an information processing apparatus which includes a memory management unit for managing files, and a processing unit for executing processing of a program on the basis of a program file supplied from the memory management unit, wherein the memory management unit comprises: a main storage means for storing the program file and various kinds of files, first management information describing information of all of the stored files, and second management information for backing up the first management information; a boot program storage means for storing a boot program to be used at boot-up; an auxiliary storage means for storing files supplied thereto; and a file management means for making access to the main storage means, the boot program storage means, and the auxiliary storage means; and the information processing unit transfers, at boot-up, the first management information and the second management information to the auxiliary storage means on the basis of the boot program that is read from the boot program storage means by the file management means, transfers the file stored in the main storage means to the auxiliary storage means on the basis of the transferred first management information, and reads the program file transferred to the auxiliary storage means by the processing unit, and executes the processing of the program thereof. Therefore, it is not necessary for the processing unit to read the program for every step from the main storage unit when executing the processing. Thereby, the processing speed of the processing unit is increased, resulting in a significant reduction in the execution time.

DETAILED DESCRIPTION OF THE INVENTION

Hereinafter, embodiments of the present invention will be described with reference to the drawings. However, the embodiments to be described are merely examples, and the present invention is not necessarily restricted thereto. Further, in the specification and drawings, "h" added to the end of a number means that the number is written in hexadecimal notation.

Embodiment 1

First of all, an information processing apparatus of the first aspect and the seventh to eleventh aspects, a memory management apparatus as defined in the twelfth to twenty-fifth aspects, a memory management method of the twenty-sixth to thirty-second aspects, and an information processing method of the thirty-third aspect will be described as a first embodiment of the present invention with reference to the drawings.

Figure 1:
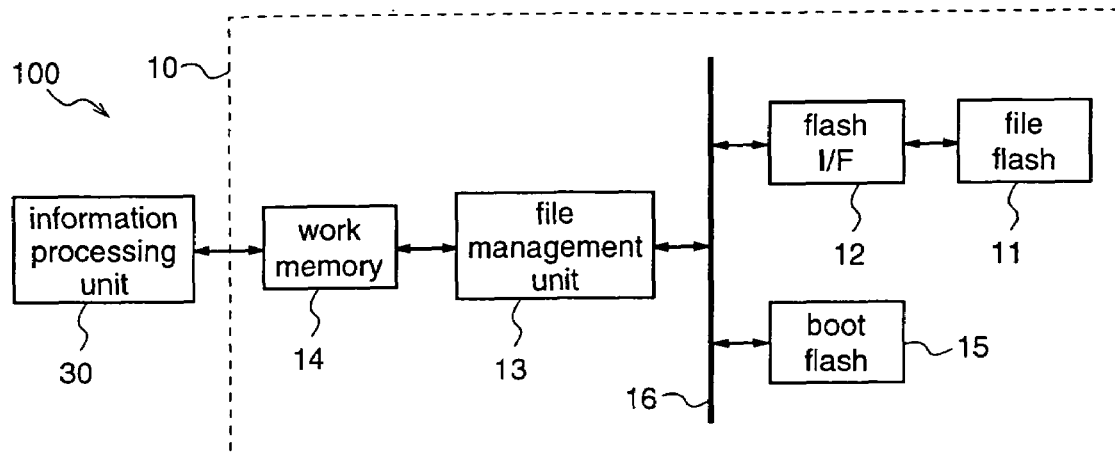
FIG. 1 is a block diagram illustrating the construction of an information processing apparatus according to a first embodiment of the present invention.

FIG. 1 is a block diagram illustrating the construction of an information processing apparatus according to the first embodiment.

As shown in FIG. 1, an information processing apparatus 100 according to the first embodiment includes a memory management unit 10 for holding program files and data files, and an information processing unit 30 for performing processing on the basis of the program files and the data files which are supplied from the memory management unit 10.

The memory management unit 10 includes a file flash 11 for storing the program files and data files, a file management unit 13 for managing the files stored in the file flash 11, a work memory 14 as a work area of the information processing unit 30, a flash interface 12 (hereinafter referred to as a flash I/F) for enabling access from the file management unit 13 to the file flash 11, and a boot flash 15 for storing a boot program. The boot flash 15 and the flash I/F 12 are connected to the file management unit 13 through a bus 16.

The file flash 11 comprises a serial flash memory such as a NAND type flash memory or an AND type flash memory. The file flash memory 11 responds to an access that is made from the file management unit 13 through the flash I/F 12, and supplies the stored data to the file management unit 13. Further, the file flash 11 erases the stored data in response to a command from the file management unit 13. When data are supplied from the file management unit 13, the file flash 11 stores the data.

Hereinafter, the construction of the file flash 11 will be described taking one having a capacity of 8 Mbytes as an example.

Figure 2:
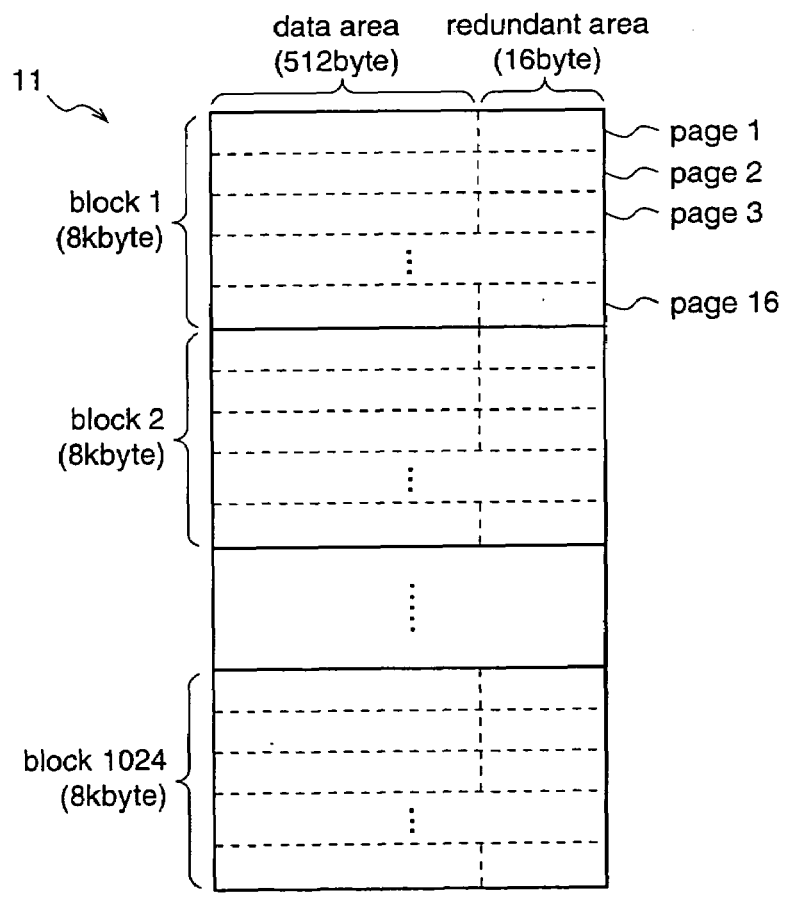
FIG. 2 is a schematic diagram for explaining the structure of a storage area of a file flash in the information processing apparatus according to the first embodiment of the present invention.

FIG. 2 shows the construction of a storage area of the file flash 11.

The storage area of the file flash 11 comprises 1024 blocks, and these blocks are successively assigned block numbers, starting from "1" for the first block up to "1024". Each block is a unit of erasing when performing erasing. Further, each block has a storage capacity of 8 Kbytes, and is divided into 16 pages each comprising 528 bytes. The respective pages are successively assigned page numbers, starting from "1" for the first page up to "16". Each page is a unit of writing when performing writing by the file management unit 13. Further, each page comprises a data area for storing a file, which data area is arranged in a range from the beginning of the page up to 512 bytes, and a redundant area to which information such as a processing result is added when updating the data area by the file management unit 13, which redundant area is arranged in a range corresponding to 16 bytes following the data area up to the end of the page. However, the present invention does not restrict the capacity of the file flash 11 and the number of blocks in the file flash 11. The file flash 11 may have an arbitrary capacity. It is desired that the capacity of the file flash 11 should be determined on the basis of the size of the file to be stored.

Figure 3:
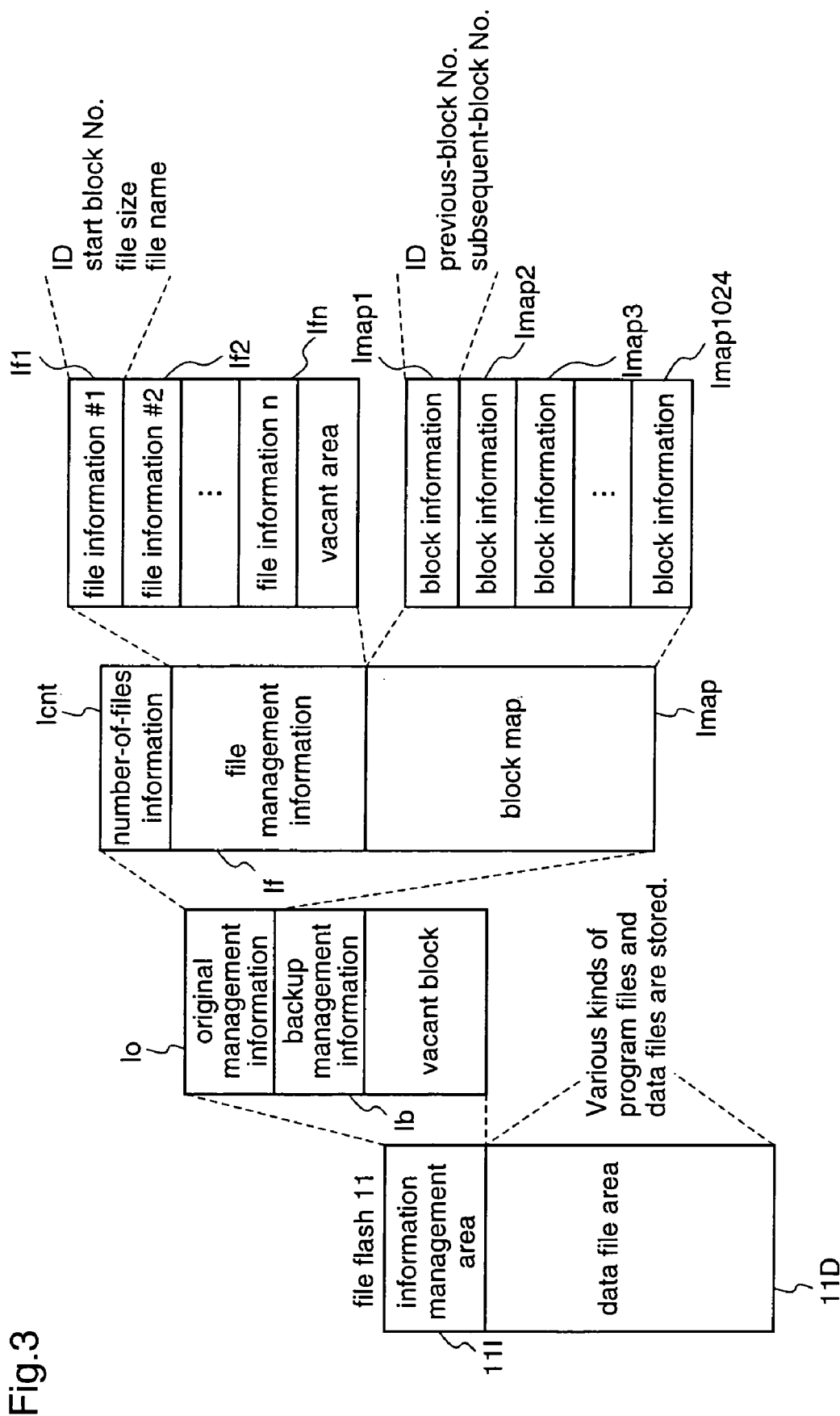
FIG. 3 is a schematic diagram for explaining the construction of the file flash in the information processing apparatus according to the first embodiment of the present invention.

Further, as shown in FIG. 3, an information management area 11I for storing management information of the files stored in the file flash 11 is arranged from the beginning of the file flash 11, and the data file area 11D is followed by a data file area 11D for storing various kinds of execution files such as a program for operating the information processing apparatus 100, and various kinds of data files which are generated during operation of the apparatus. Each page in each block included in the information management area 11I or the data file area 11D is composed of a data area of 512 bytes and a redundant area of 16 bytes, and the program files and data files are stored in the data area.

The files stored in the file flash 11 are assigned file IDs for identifying the respective files. Each file ID comprises a four-digit number written in hexadecimal notation, and the attribute of the file is defined by the number. For example, a file ID having the upper three digits being 0 indicates a file of management information to be stored in the information management area 11I, and a file ID having the upper three digits being nonzero indicates a program file or a data file to be stored in the data file area 11D. In this case, the file IDs of management information range from 0000h to 000Fh, and file ID=0000h is assigned to original management information Io while file ID=0001h is assigned to backup management information Ib. The file IDs of the program file and the data file are numbers larger than 0010h. When there are three files, file 1~file 3, file ID=0010h is assigned to file 1, file ID=0011h is assigned to file 2, and file ID=0012h is assigned to file 3.

In the information management area 11I, the original management information Io (first management information) which describes management information relating to the files stored in the data file area 11D is placed in block 1, and the backup management information Ib (second management information) which is a backup to be used when a defect occurs in the original management information Io and has the same data as the original management information Io is placed in block 2. When three or more blocks are allocated as the information management area 11I, the blocks from block 3 to the last block are empty blocks wherein data are not stored. These empty blocks are used for storing the original management information Io and the backup management information Ib when defects occur in the blocks 1 and 2.

In the original management information Io and the backup management information Ib, file number information Icnt relating to the number of files stored in the data file area 11D is placed from the beginning, the file number information Icnt is followed by file management information If having information such as file names and file sizes of the respective files stored in the data file area 11D, and the file management information If is followed by a block map Imap which can restore a series of files which are separately stored in plural blocks.

The file management information If describes information of the respective files stored in the file flash 11, and has plural pieces of file information If1~Ifn which are assigned to n (n: an integer equal to or larger than 1) pieces of files stored in the file flash 11, each by a predetermined capacity, respectively. The file management information If secures a capacity of data corresponding to the number of files storable in the data file area 11D. When the number of files stored in the data file area 11D is smaller than the number of storable files, the redundant area becomes an empty area where data are not stored.

Further, each of the file information If1~Ifn has the ID of the corresponding file, the start block number, the file size, and the file name. The ID is, for example, a file ID described in a form of "ID=XXXXh", and the start block number is a block number in which the beginning of the corresponding file is stored. When no file is assigned to the ID, the start block number may be "FFFFh" and the file name may be blanked. In this case, when a file is assigned to this ID at rewriting or the like, the start block number and the file name are described.

Since, in the file flash 11, the files are managed in block units, there may be a case where a file is divided into plural parts to be stored in plural blocks which are not adjacent to each other. Even in such case, the block map Imap clearly shows the locations of the divided files so that a series of files can be restored, and has a plurality of block information Imap1~Imap1024 which are respectively assigned to the 1024 blocks possessed by the file flash 11.

Each of the block information Imap1~Imap1024 has the ID of a file stored in the corresponding block, a previous-block number in which the forward part of the file is stored, and a subsequent-block number in which the backward part of the file is stored. When a file is stored in the block, the file ID of this file is described in the ID. When no file is stored in the block, the state of the block is indicated by a flag. For example, an ID of a block having a defect may be "FEEEh", and an ID of an unused block in which no file is written may be "FFFFh". When the middle part of a file is stored in the block, a block number holding the forward part of this file is described in the previous-block number. The previous-block number of a block having the forward part of a file or an unused block may be "FFFFh". On the other hand, when the middle part of a file is stored in the block, a block number holding the subsequent part of this file is described in the subsequent-block number. The subsequent-block number of a block holding the end part of a file or an unused block may be "FFFFh".

Figure 4:
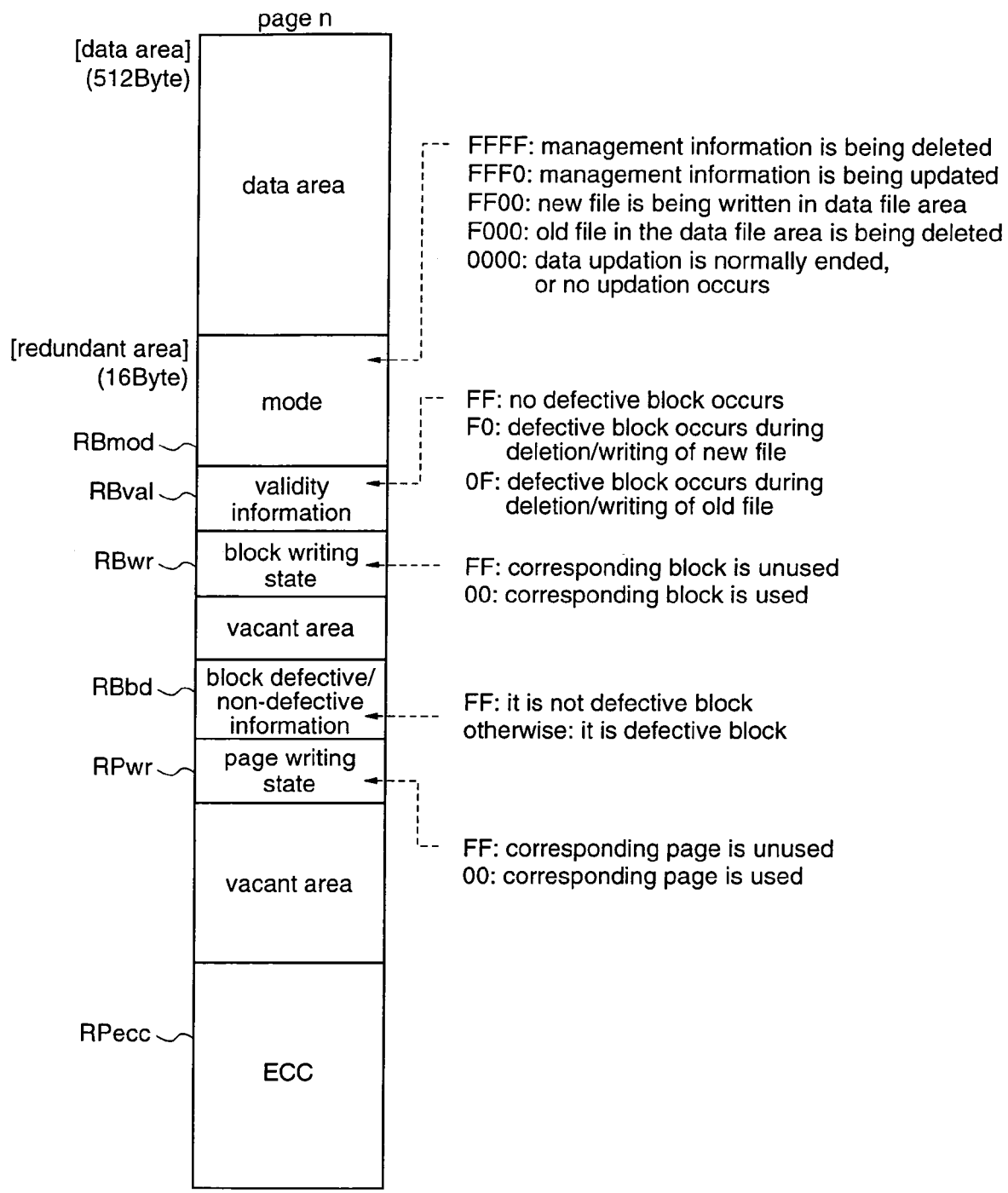
FIG. 4 is a schematic diagram for explaining the structure of a redundant area of a file flash in the information processing apparatus according to the first embodiment of the present invention.

As shown in FIG. 4, the redundant area is an area of 16 bytes to which information such as a processing result of erasing or writing performed on the data area is added, and the redundant area is placed subsequently to the data area which occupies 512 bytes from the beginning of each page. The redundant area includes mode RBmod indicating the updation state of the data area, validity information RBval indicating whether a defect occurs or not during the updation of the data area, block writing state RBwr indicating whether the corresponding block is used or not, block defective/non-defective information RBbd indicating whether the block is a defective block having a defect or not, page writing state RPwr indicating whether the corresponding page is used or not, and ECC information RPecc holding ECC (Error Correction Code) data of the data area of the page. Further, the redundant area has a vacant area having no data. The block writing state RBwr and the page writing state RPwr correspond to an end-of-writing indication area described in Claims.

When updating the contents in the data area of the corresponding block, the mode RBmod is a flag indicating the state of erasing and writing from/into the block. To be specific, the state where the original management information Io or the backup management information Ib is being erased is defined as "FFFFh", the state where the original management information Io or the backup management information Ib is being updated (where a new file is being generated) is defined as "FFF0h", the state where the new file is being written in the data file area 11D is defined as "FF00h", the state where the old file in the data file area 11D is being erased is defined as "F000h", and the state where the data updation is normally ended or the state where no updation is carried out is defined as "0000h". The mode RBmod is added to the redundant areas in the first to third pages of each block or to the redundant area in the first page.

The validity information RBval is a flag indicating whether a defective block (unusable block) occurs or not in erasing or writing from/into the data area in the corresponding block, wherein the state where no defective block occurs is defined as "FFh", the state where a defective block occurs during erasing or writing of a new file is defined as "F0h", and the state where a defective block occurs during erasing or writing of an old file is defined as "0Fh". The validity information RBval is added to the redundant areas in the first to third pages of each block.

The block writing state RBwr is a flag indicating whether the corresponding block is used or not, wherein the state where the block is unused is defined as "FFh", and the state where the block is used (the state where writing is ended) is defined as "00h". The block writing state RBwr is added to the redundant areas in the first to third pages of each block or to the redundant area in the first page.

The block defective/non-defective information RBbd is a flag indicating whether the corresponding block is a defective block (unusable block) or not, wherein the state where the block is not a defective block is defined as "FFh", and the state where the block is a defective block is defined as "00h". The block defective/non-defective information RBbd is added to the redundant areas in the first to third pages of each block or to the redundant area in the first page.

The page writing state RPwr is a flag indicating whether the corresponding page is used or not, wherein the state where the page is unused is defined as "FFh", and the state where the page is used (the state where writing is ended) is defined as "00h". The page writing state RPwr is added to the redundant area in each page.

In the present invention, the flags to be added to the respective redundant areas are not restricted to those mentioned above, and the respective states can be defined as arbitrary flags.

The file management unit 13 reads the boot flash 15 at boot-up, and stores the file stored in the file flash 11 into the work memory 14 on the basis of the boot program. When the file in the work memory 14 is updated, the file management unit 13 generates new management information for updating the file in the file flash 11, writes the file updated on the basis of the new management information into the file flash 11, erases the old file, and updates the original management information Io and the backup management information Ib in the file flash 11 on the basis of the contents of the new management information. Further, according to a command from the information processing unit 30, the file management unit 13 generates new management information for erasing the file from the file flash 11, erases the file from the file flash 11 on the basis of the new management information, and updates the original management information Io and the backup management information Ib in the file flash 11 according to the contents of the new management information. Further, when a new file is generated in the work memory 14, the file management unit 13 generates new management information for writing the new file into the file flash 11, writes the file in the file flash 11 on the basis of the new management information, and updates the original management information Io and the backup management information Ib in the file flash 11 on the basis of the new management information. Furthermore, the file management unit 13 checks the states of the file, block, and page in the file flash 11 on the basis of the values indicated in the redundant area. The file management unit 13 includes a file management means, a management information generation means, a first management information updating means, a storage processing means, a second management information updating means, and an indication value acquisition means.

The work memory 14 is implemented by a SDRAM (Synchronous Dynamic Random Access Memory), and stores the files such as the original management information Io and the backup management information Ib which are supplied from the file management unit 13 at boot-up. Hereinafter, the original management information Io stored in the work memory 14 will be referred to as "management information Iw". Further, the file management unit 13 and the information processing unit 30 exchange data through the work memory 14.

The boot flash 15 stores a boot program which defines processing of the information processing unit 100 at boot-up. The boot program defines the following steps at boot-up: a step of enabling the file management unit 13 to use the file flash 11, a step of reading the data stored in the information management area 11I into the work memory 14 by the file management unit 13, a step of reading all of the files stored in the data file area 11D into the work memory 14 according to the description of the management information Iw, and a step of reading the transferred program from the beginning by the information processing unit 30.

Next, a description will be given of methods for erasing, writing, and reading a file from/into the file flash 11 in the memory management apparatus 10 constructed as described above.

Initially, a method for erasing a file written in the file flash 11 will be described.

Figure 7:
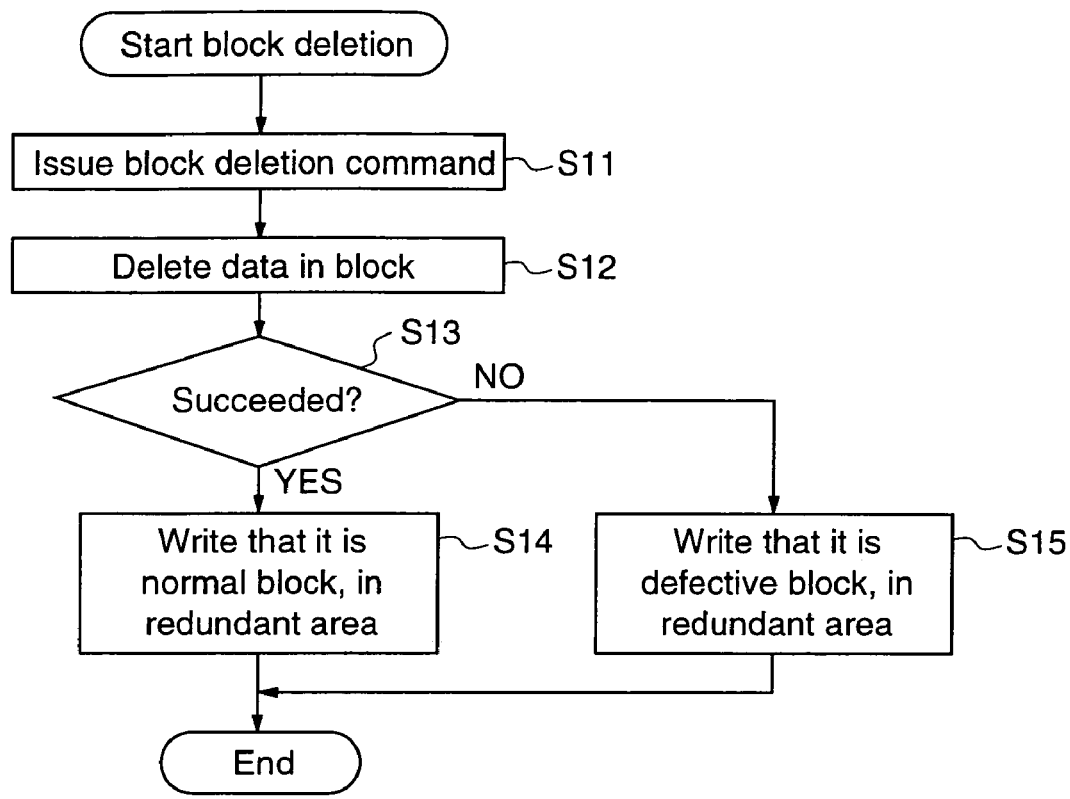
FIG. 7 is a flowchart for explaining a method for erasing a block in a file flash of a memory management apparatus according to the first embodiment of the present invention.

The unit of erasing from the file flash 11 is a block, and "block erasing" for erasing the contents of each block is carried out when erasing a file. Hereinafter, the block erasing method will be described. FIG. 7 is a flowchart for explaining the block erasing method.

When performing block erasing, the file management unit 13 specifies the block number of a block to be erased, and issues a block erasing command (step S11).

Then, the file flash 11 erases the contents of the block specified by the file management unit 13 (step S12).

Next, the file management unit 13 judges whether the erasing has normally ended or not, according to an error code returned from the file flash 11 (step S13).

When the erasing has succeeded, it is entered that the corresponding block is a normal block, into the redundant area of the block. Since the erased bit is "1", when the erased block is a block in the information management area 11I, the mode RBmod indicates that erasing of the block has normally ended. Likewise, the validity RBval indicates that the block is a normal block, the block defective/non-defective information RBbd indicates that the block is not a defective block, and the page writing state RPwr indicates that the block is an unused block, and therefore, writing is not particularly carried out in this step (step S14).

On the other hand, when the erasing has failed, it is entered that the corresponding block is a defective block, into the redundant area of the block. That is, "0Fh" indicating that a defective block is generated during erasing of an old file is described in the validity information RBval, and information indicating that the corresponding block is a defective block is described in the block defective/non-defective information RBbd (step S15).

Figure 8:
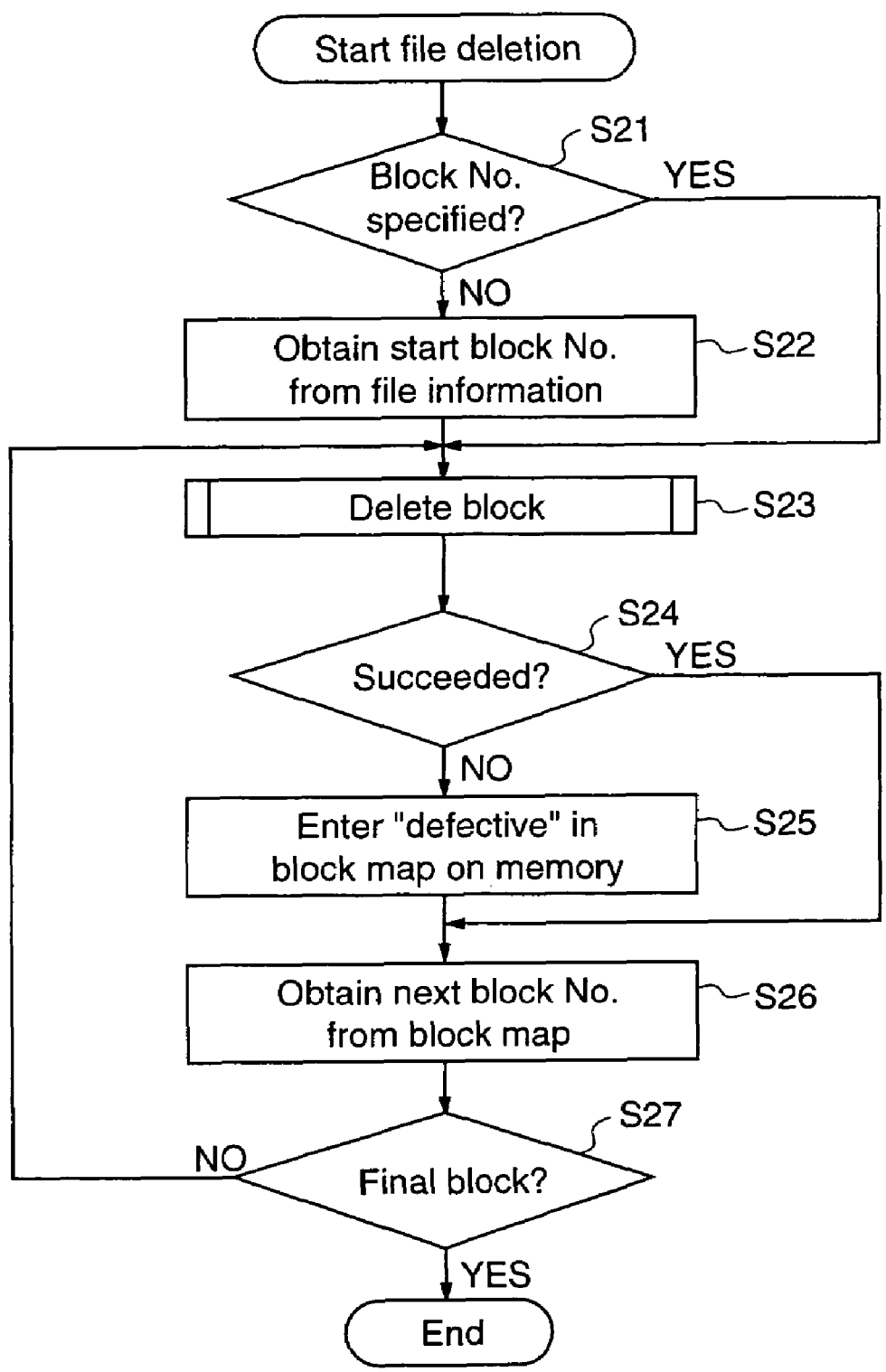
FIG. 8 is a flowchart for explaining a method for erasing a file from the file flash of the memory management apparatus according to the first embodiment of the present invention.

Next, a method of erasing a file stored in the file flash 11 by such block erasing will be described. FIG. 8 is a flowchart for explaining the file erasing method.

When performing file erasing, since the file management unit 13 recognizes the block number of a block to be erased or the file ID of a file to be erased, the file management unit 13 initially judges whether it recognizes the block number to be erased or not, that is, whether it can specify the block number to be erased for the file flash 11 or not. When the file management unit 13 recognizes the block number to be erased, it goes to step S23 (step S21).

When the file management unit 13 does not recognize the block number to be erased, it searches the file management information If of the management information Iw stored in the work memory 14, and obtains the number of a start block where the beginning of a file to be erased is stored, from the file information having the file ID of the file to be erased (step S22).

When the file management unit 13 obtains the block number to be erased, it executes block erasing of the corresponding block. This block erasing is carried out according to steps S11~S15 described above (step S23).

Next, the file management unit 13 judges whether the block erasing has normally ended or not, and goes to step S26 when it has normally ended (step S24).

When the block erasing has failed, the file management unit 13 enters that the corresponding block is a defective block, i.e., a disable block which cannot be used, in the block map Imap of the management information Iw stored in the work memory 14. For example, when the file management unit 13 has failed in erasing a block BN, "FEEEn" is described in the ID of the block information ImapBN. At this time, the management information Iw becomes management information for correction in which the disable block is described (step S25).

When it is judged in step S24 that the block erasing has normally ended, the file management unit 13 obtains the block number of a block in which the next part of the file being erased is stored, from the block map Imap. For example, when the block BN is erased, the file management unit 13 obtains the next block number from the block information ImapBN (step S26).

Then, the file management unit 13 judges whether the block erased in step S23 is a block at the end of the file or an unused block on the basis of the obtained subsequent-block number. When the erased block is a block at the file end or an unused block, the file management unit 13 ends the processing. When the erased block is not a block at the file end nor an unused block, the file management unit 13 returns to step S23 to carry out block erasing (step S27).

Hereinafter, steps S21~S27 are referred to as "file erasing flow F1".

Next, a method of writing a file in the file flash 11 will be described.

Figure 9:
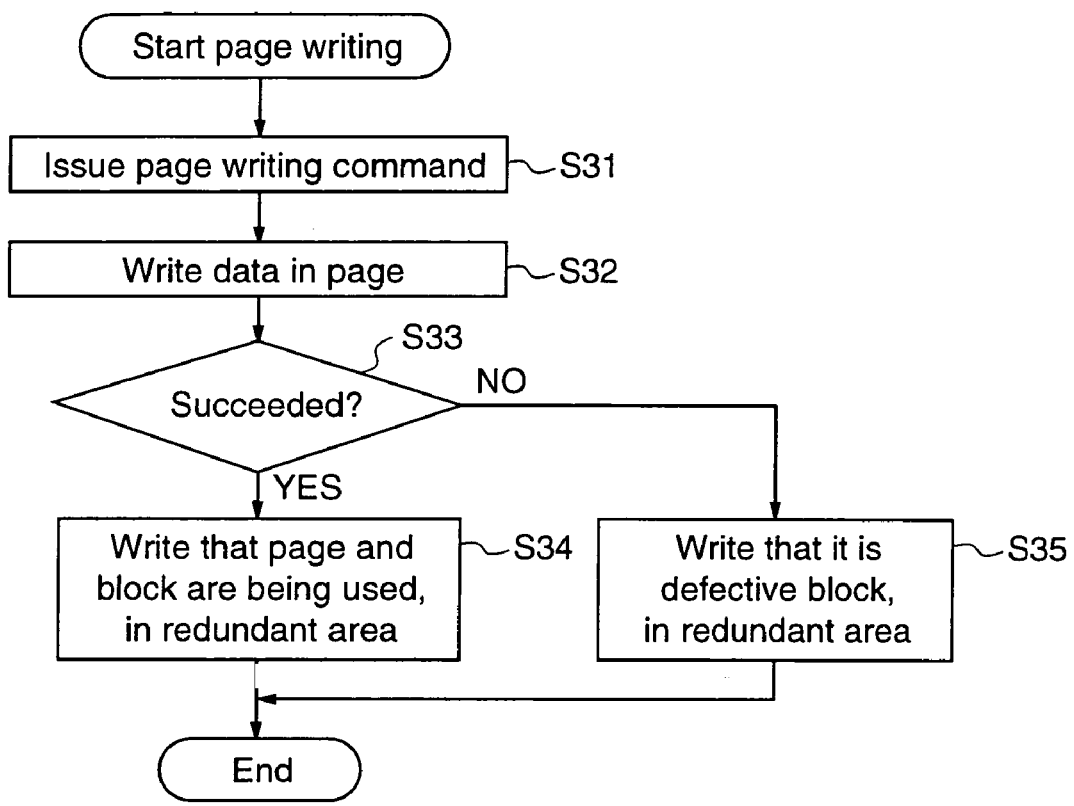
FIG. 9 is a flowchart for explaining a method for writing a page in the file flash of the memory management apparatus according to the first embodiment of the present invention.

The unit of writing into the file flash 11 is a page, and "page writing", i.e., writing of data for every page, is carried out. A method of such page writing will be described. FIG. 9 is a flowchart for explaining a method of page writing.

When performing page writing, the file management unit 13 issues a page writing command that specifies a block and a page into which data is to be written, to the flash I/F 12. Then, the file management unit 13 outputs the data and file ID of the file stored in the work memory 14 (step S31).

On receipt of the page writing command, the flash I/F 12 makes the specified page in the file flash 11 writable, and outputs the data to be written, which is supplied from the file management unit 13, serially to the file flash 11. Then, the file flash 11 writes the data supplied from the flash I/F 12 into the page specified by the file management unit 13 (step S32).

Next, the file management unit 13 judges whether the writing has normally ended or not, on the basis of an error code returned from the file flash 11 (step S33).

When the writing has succeeded, the file management unit 13 enters that the block and the page are being used, in the redundant area of the block. That is, it enters "00h" indicating that writing is being carried out, in the block writing state RBwr and the page writing state RPwr (step S34).

On the other hand, when writing has failed, the file management unit 13 enters that the block is a defective block, in the redundant area of the block. That is, it enters "F0h" or "0Fh" indicating that a defective block is generated during file writing, in the validity information RBval, and enters information indicating that the block is a defective block, in the block defective/non-defective information RBbd (step S35).

Figure 10:
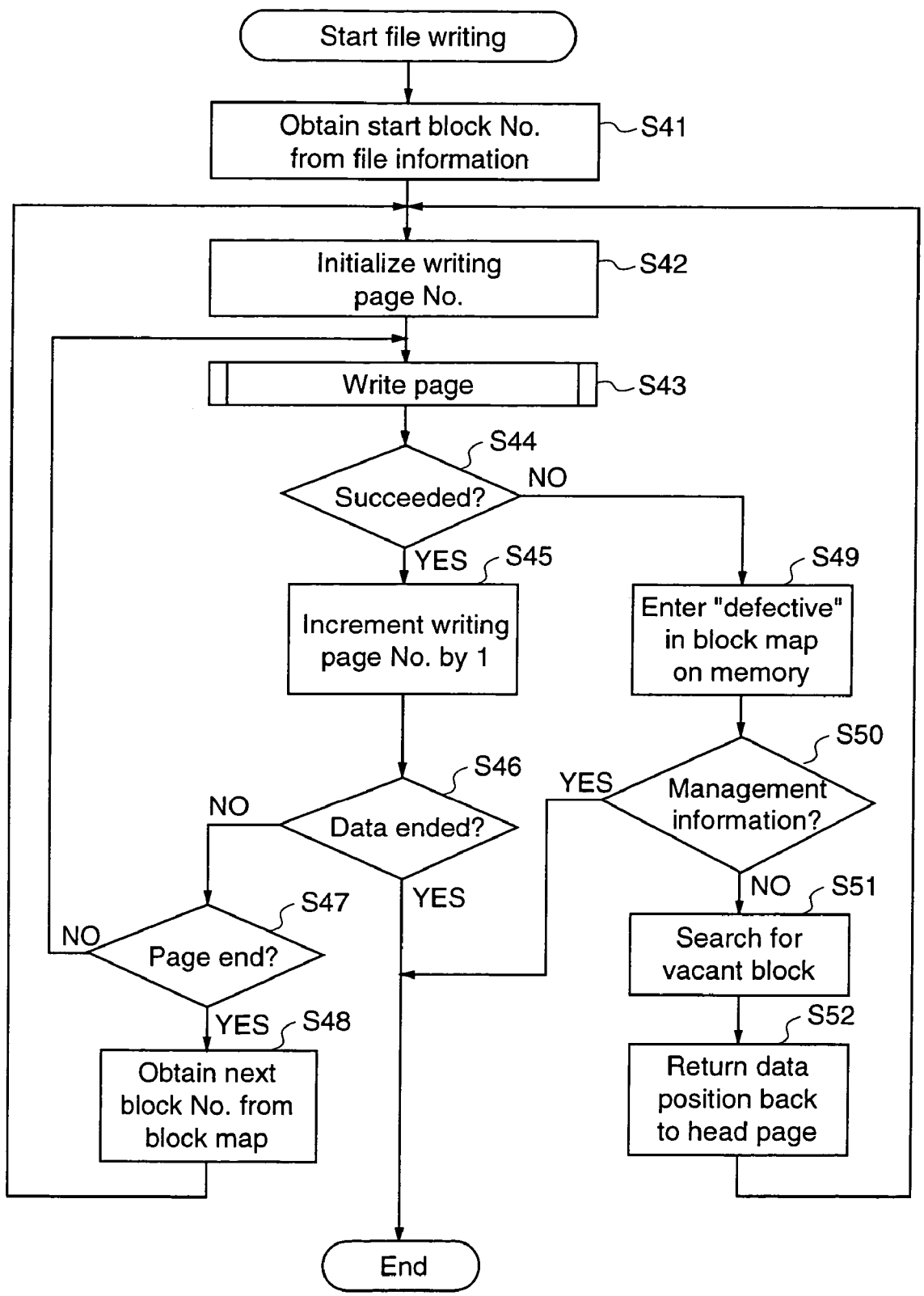
FIG. 10 is a flowchart for explaining a method for writing a file in the file flash of the memory management apparatus according to the first embodiment of the present invention.

Next, a method for writing a file in the file flash 11 by the above-mentioned page writing will be described. FIG. 10 is a flowchart for explaining the file writing method.

When performing file writing, the file management unit 13 searches the file management information If of the management information Iw stored in the work memory 14, and obtains the number of a start block at the beginning of the file, from the file information having the file ID of the file to be written (step S41).

Next, the file management unit 13 assigns "0" to a variable that contains the page number of a page to be written (step S42).

After obtaining the block number and the page number as the targets of writing, the file management unit 13 executes page writing into the corresponding page. This page writing is carried out according to steps S31~S35 described above (step S43).

Next, the file management unit 13 judges whether the page writing has normally ended or not, and goes to step S49 when the page writing has failed (step S44).

When the page writing has succeeded, the page number variable is incremented by "1" for writing of the next page (step S45).

Then, the file management unit 13 judges whether writing of all data has completed or not, and ends the processing when writing of all data has completed (step S46).

When writing of data has not yet completed, the file management unit 13 judges whether the data have been written into the final page in the corresponding block or not, on the basis of the page number variable. When the data have not yet been written up to the final page, the file management unit 13 returns to step S43 to perform writing into the next page (step S47).

When the data have been written up to the final page, the file management unit 13 obtains the block number of a block which holds the next part of the file being written. For example, when the data have been written in the block BN, the file management unit 13 obtains the next block number from the block information ImapBN. Then, the file management unit 13 returns to step S42 to perform writing into the next block (step S48).

On the other hand, when the file management unit 13 judges in step S44 that the page writing has failed, the file management unit 13 halts writing into the block, and enters that the block is a defective block, in the block map Imap of the management information Iw stored in the work memory 14. For example, when writing into the block BN has failed, "FEEEh" is described in the ID of the block information ImapBN (step S49).

The file management unit 13 judges whether the file that has failed in writing is the original management information Io or the backup management information Ib, and ends the processing when it has failed in writing the original management information Io or the backup management information Ib. A recovery processing in the case where writing of the original management information Io and the backup management information Ib has failed will be described later (step S50).

When the file that has failed in writing is not the original management information Io nor the backup management information Ib, the file management unit 13 searches for a vacant block in which no data is written, to perform writing into an alternative block. The file management unit 13 searches the block map Imap of the management information Iw stored in the work memory 14 to obtain block information whose file ID is unused (FFFFh). Then, the file management unit 13 enters the file ID of the file being written, in the obtained block information, and secures the block as an alternative block in which the file that has failed in writing should be written (step S51).

Then, the file management unit 13 resets the data position in the file by the number of written pages, and returns to step S42 to perform writing again from the first page of the block that is secured in step S51 (step S52).

Hereinafter, steps S41~S52 described above are referred to as "file writing flow F2".

Next, a method of reading a file from the file flash 11 will be described.

Figure 11:
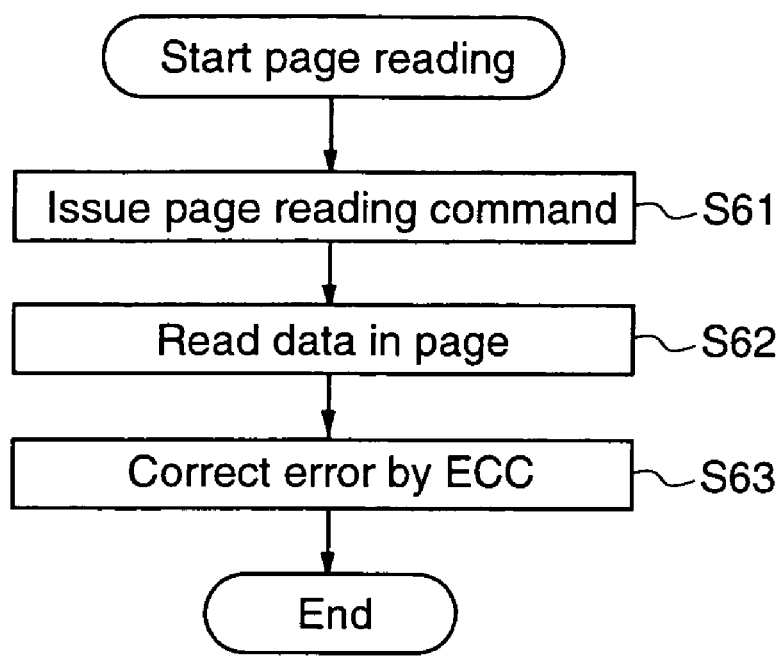
FIG. 11 is a flowchart for explaining a method for reading a page from a file flash of the memory management apparatus according to the first embodiment of the present invention.

The unit of reading from the file flash 11 is a page, and the file management unit 13 performs "page reading", i.e., reading of data for each page. FIG. 11 is a flowchart for explaining a method of page reading.

When performing page reading, the file management unit 13 specifies a block and a page to be read, and outputs a page reading command through the bus 16 to the flash I/F 12 (step S61).

Then, the flash I/F 12 serially reads the data stored in the designated page in the file flash 11, and outputs the data through the bus 16 to the file management unit 13 (step S62).

When there is an error in the read data, error correction is carried out by ECC (step S63).

Figure 12:
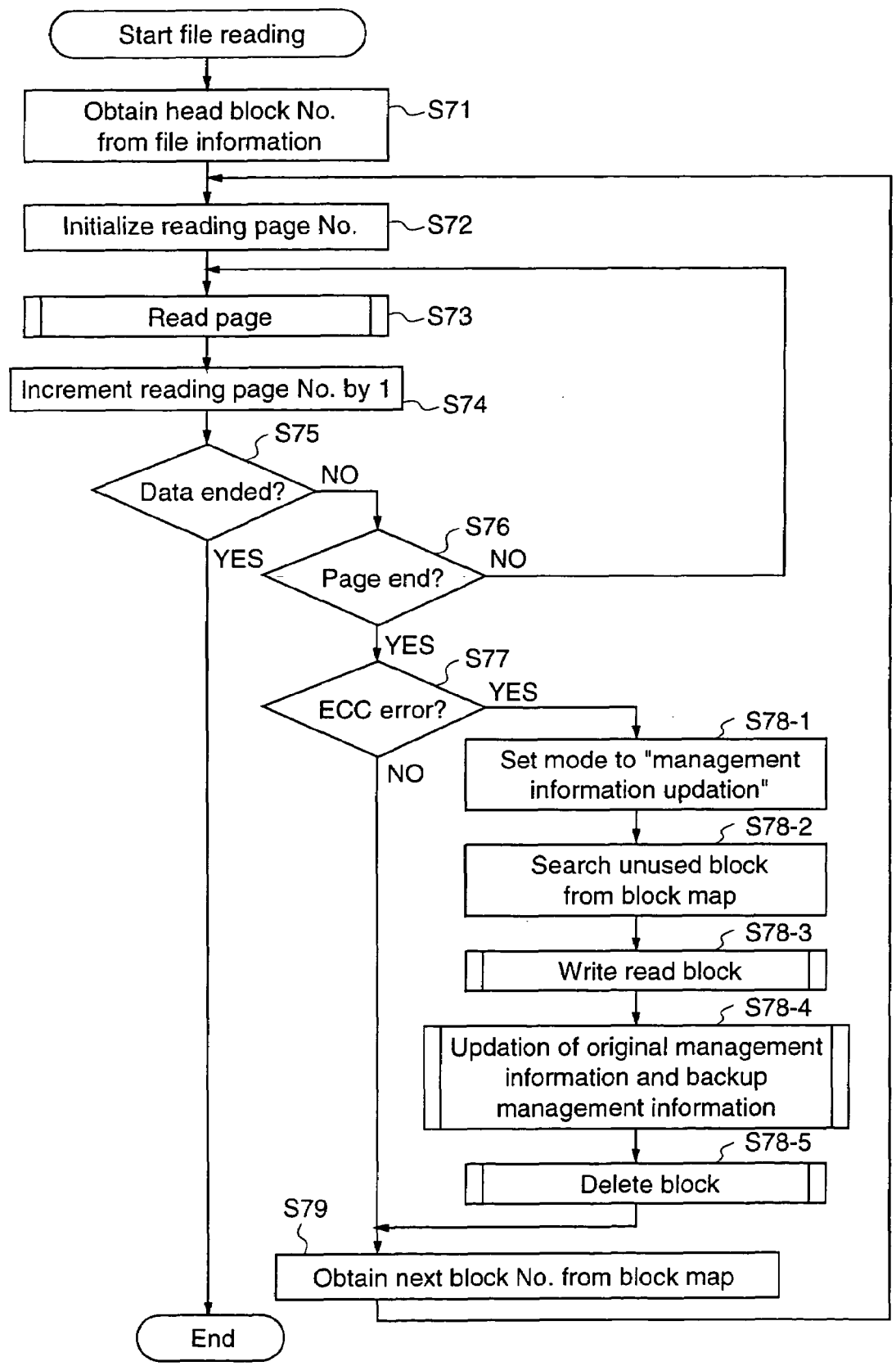
FIG. 12 is a flowchart for explaining a method for reading a file from the file flash of the memory management apparatus according to the first embodiment of the present invention.

Next, a method of reading a file from the file flash 11 by the above-mentioned page reading will be described. FIG. 12 is a flowchart for explaining the file reading method.

When performing file reading, the file management unit 13 searches the file management information If of the management information Iw stored in the work memory 14, and obtains, from the file information having the file ID of a file to be read, the number of a start block in which the beginning of the file is stored (step S71).

Next, the file management unit 13 assigns "0" to the variable that holds the page number to be read (step S72).

After obtaining the block number and the page number as the targets of reading, the file management unit 13 executes page reading for the corresponding page. This page reading is carried out according to steps S61~S63 described above (step S73).

When the page reading has completed, the page number variable is incremented by "1" for reading of the next page (step S74).

Then, the file management unit 13 judges whether reading of all data has completed or not on the basis of the file management information of the file information Ifn of the file to be read. When reading of data has completed, the file management unit 13 ends the processing (step S75).

When reading of data has not yet completed, the file management unit 13 judges whether the data have been read up to the final page of the block or not, on the basis of the page number variable. When the data have not been read up to the final page, the file management unit 13 returns to step S73 to perform reading for the next page (step S76).

When the data have been read up to the final page, the file management unit 13 judges whether the read data have an ECC error or not, and goes to step S79 when there is no ECC error (step S77).

When there is an ECC error in the read data, in order to erase the data in the block where the error occurs and write the data into another block, the file management unit 13 writes "FFF0h" in the mode RBmod of the block where the original management information Io of the file flash 11 is stored to display that the original management information Io is being updated (step S78-1).

Next, the file management unit 13 searches the block map Imap of the management information Iw stored in the work memory 14 to obtain the block information of a vacant block whose ID is unused. Then, the file management unit 13 enters the file ID in the ID of the obtained block information to secure the block managed by this block information as a block for holding the data of the block in which the ECC error occurs. Further, when the data to be stored in this block is a portion of the file, the previous block number and the subsequent block number are described. Further, the file management unit 13 erases the ID, the previous block number, and the subsequent block number from the block map of the block where the ECC error occurs, i.e., the block from which the data should be erased. At this time, the information of the block having the error is erased from the management information Iw, resulting in new management information Iw' to which information of the block where data are to be newly written is added (step S78-2).

After the vacant block is secured, the file management unit 13 writes the data of the read block into the secured block. This writing is carried out according to steps S42~S47 and steps S49~S52 described above (step S78-3).

Next, the file management unit 13 updates the original management information Io and the backup management information Ib. That is, it erases the original management information Io and writes the new management information Iw' into the erased block, and thereafter, erases the backup management information Ib and writes the new management information Iw' into the block from which the information Ib is erased. The method of updating the original management information Io and the backup management information Ib will be described later (step S78-4).

Then, the file management unit 13 erases the data of the block where the ECC error occurs. This block erasing is carried out according to steps S11~S15 described above (step S78-5).

In this way, every time the file management unit 13 reads a block, it obtains the block number of a block that contains the next portion of the file, from the block map Imap. For example, when the file management unit 13 reads the block BN, it obtains the next block number from the block information ImapBN. Then, the file management unit 13 returns to step S72 to perform reading for the next block (step S79).

Hereinafter, steps S71~S79 are referred to as a file reading flow F3.

Next, an information processing method by the information processing apparatus 100 and a memory management method by the memory management apparatus 10 will be described.

Initially, the operation of the information processing apparatus 100 at boot-up will be described with reference to the drawings.

Figure 13:
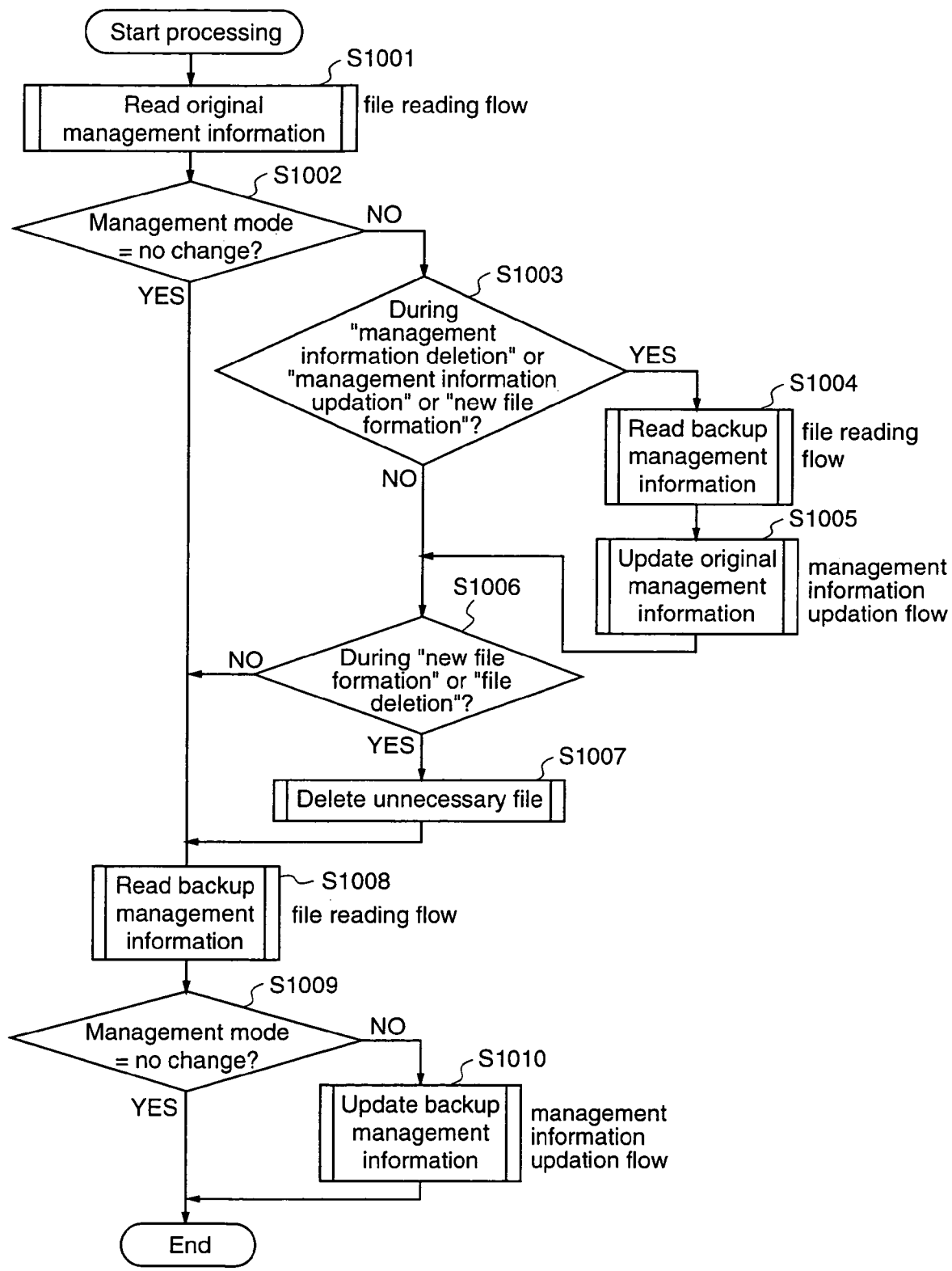
FIG. 13 is a flowchart for explaining booting by the information processing apparatus according to the first embodiment of the present invention.

When power is applied to the information processing apparatus 100, the information processing unit 30 instructs the memory management apparatus 10 to read the boot flash 15. Then, the file management unit 13 reads the boot program stored in the boot flash 15, and executes booting. FIG. 13 is a flowchart for explaining the booting by the memory management apparatus 10.

Initially, the file management unit 13 reads the original management information Io from the file flash 11 into the work memory 14 according to the file reading flow F3 (step S1001).

Next, the file management unit 13 judges whether the previous writing of a file into the file flash 11 has normally ended or not, on the basis of the mode RBmod in the redundant area of the management information Iw that is read onto the work memory 14.

Figure 5:
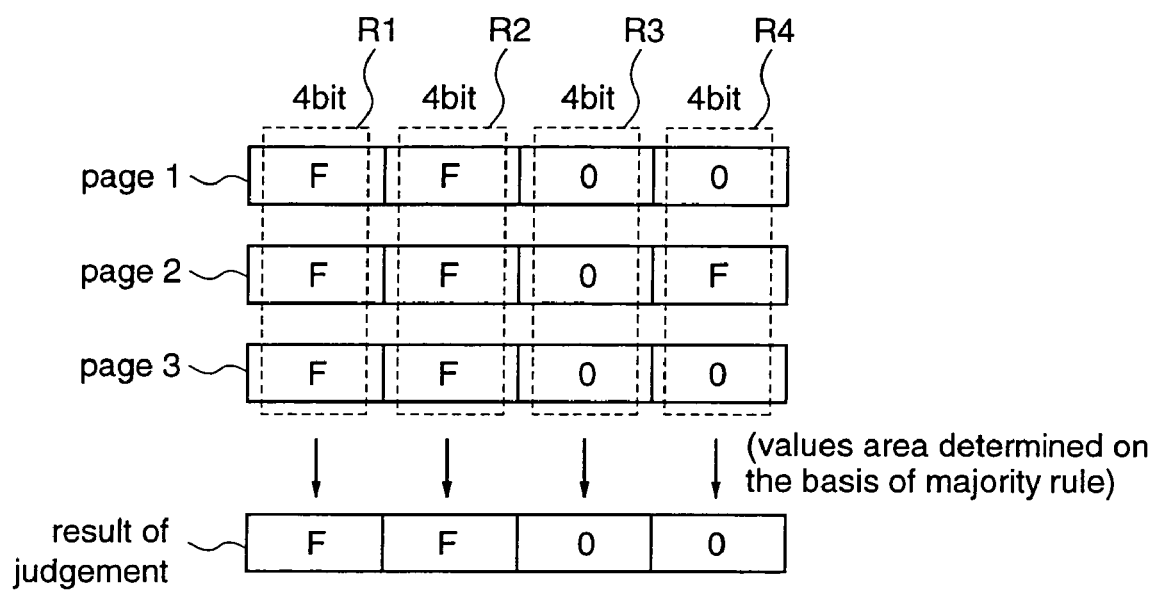
FIG. 5 is a diagram for explaining a method of determining a mode of the redundant area in the information processing apparatus according to the first embodiment of the present invention.

Initially, a value of 16 bits written in the mode RBmod is divided for every four bits, and it is judged whether "0" is written in every four bits. The value of 4 bits is defined as "0h" when "0" is written in three or more bits among the four bits while the value of 4 bits is defined as "Fh" when "0" is not written in three or more bits, thereby to judge the four values of the mode RBmod. When the mode RBmod is added to predetermined bit positions from the top page to the third page in the block, the file management unit 13 judges the values of the respective pages on the basis of majority rule. For example, as shown in FIG. 5, when the value of page 1 is "FF00h", the value of page 2 is "FF0Fh", and the value of page 3 is "FF00h", the values of the upper four bits (R1) of the respective pages are the same, and the value of R1 is judged as "Fh". Likewise, since the values of the bits from the fifth bit to the twelfth bit (R2,R3) of the respective pages are the same, the value of R2 is judged as "Fh" and the value of R3 is judged as "0h". As for the lower four bits, those of page 1 are different from those of pages 0 and 2, and therefore, the value of R4 is judged as "0h" on the basis of majority rule.

When the mode RBmod whose value is judged on the basis of the majority rule as described above is "0000h", the file management unit 13 determines that data updation has normally ended, and goes to step S1008 (step S1002).

When the previous data updation has not normally ended, the file management unit 13 judges whether the original management information Io is being erased (or being updated) or the file in the data file area 11D is being written, on the basis of the mode RBmod of the block that contains the original management information Io. The file management unit 13 goes to step S1006 when the value of the mode RBmod that is obtained by majority judgement in step S1002 is none of "FFFFh", "FFF0h", and "FF00h" (step S1003).

When the original management information Io is being erased (or being updated) or the file in the data file area 11D is being written (when a new file is being formed), the backup management information Ib is read from the file flash 11 into the work memory 14 to be used as original management information. This reading of the backup management information Ib is performed according to the file reading flow F3 (step S1004).

Next, the contents of the backup management information Ib (hereinafter, new management information Iw') on the work memory 14, which has been read in step S1004, is written in the block where the original management information Io of the file flash 11 is stored (step S1005).

Figure 15:
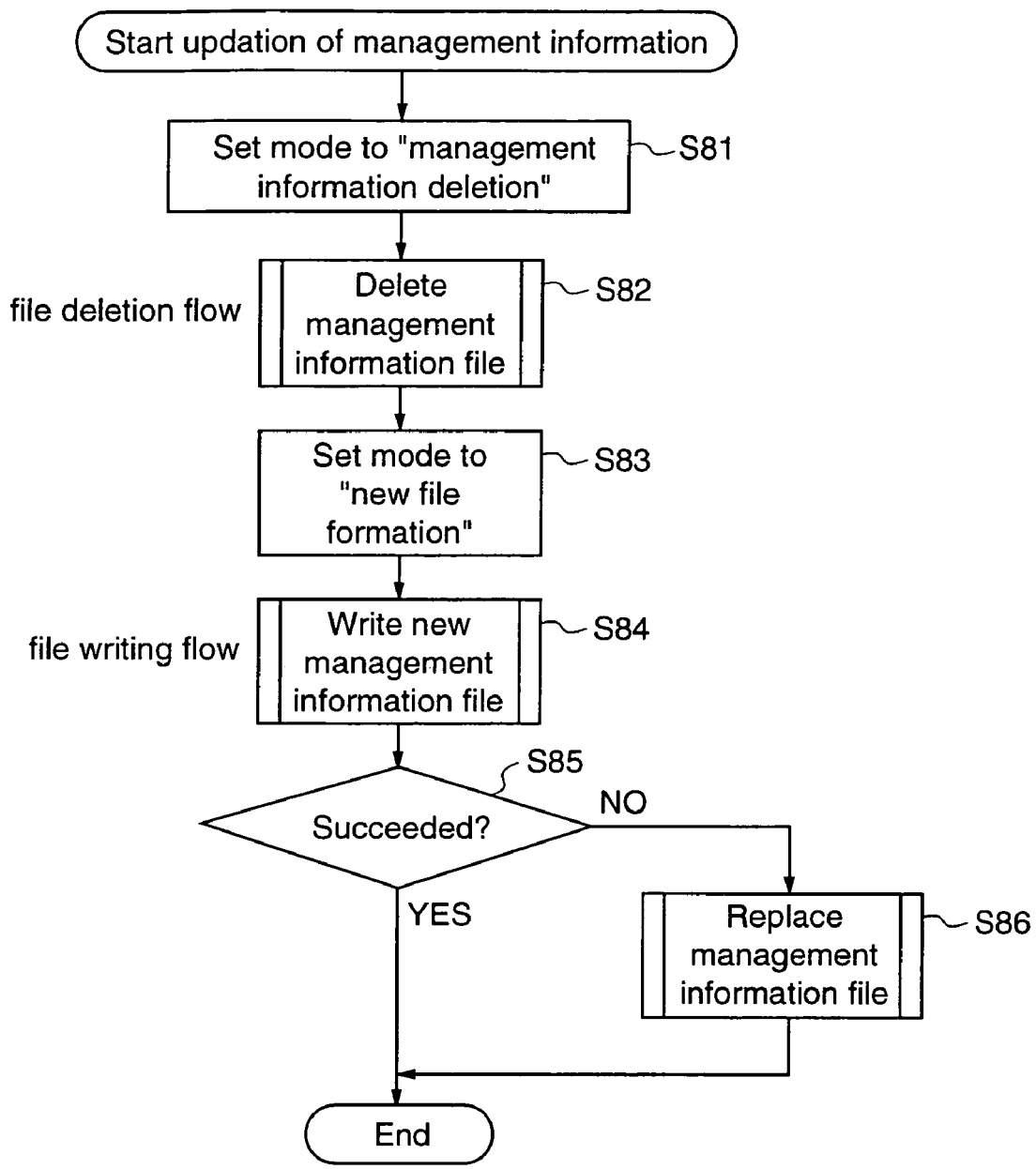
FIG. 15 is a flowchart for explaining a method for updating original management information and backup management information in the file flash by the memory management apparatus according to the first embodiment of the present invention.

A method of updating the original management information Io in the file flash 11 will be described with reference to FIG. 15.

Initially, the file management unit 13 writes "FFFFh" in the mode RBmod of the block which contains the original management information Io of the file flash 11 to indicate that the original management information Io is being erased (step S81).

The file management unit 13 erases the original management information Io from the file flash 11 according to the file erasing flow F1 (step S82).

Then, "FFF0h" is written in the mode RBmod of the block which contains the original management information Io of the file flash 11 to indicate that the original management information is being updated (step S83).

Next, the file management unit 13 outputs the new management information Iw' to the flash I/F 12, and writes it into the block that is erased in step S82. This writing is carried out according to the file writing flow F2 (step S84).

Thereafter, the file management unit 13 judges whether the file writing has succeeded or not, and ends the updation of the management information when it has succeeded (step S85).

Figure 16:
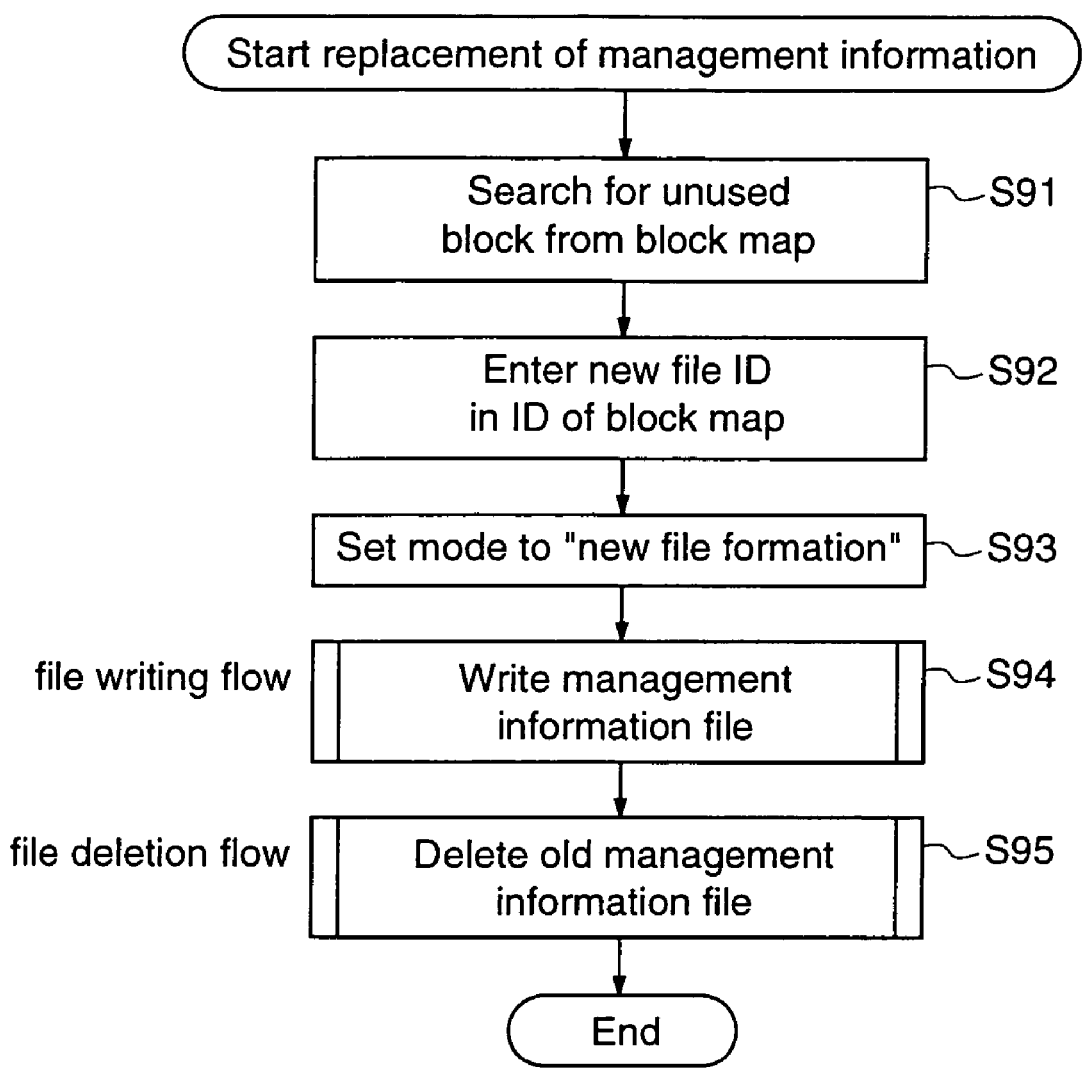
FIG. 16 is a flowchart for explaining a method for writing the original management information and the backup management information of the file flash into a new block by the memory management apparatus according to the first embodiment of the present invention.

On the other hand, when the file writing has failed, the original management information Io is written into a new block by the method shown in FIG. 16 (replacement of original management information) (step S86).

When replacing the original management information Io, initially a vacant block is detected from the block map Imap of the new management information Iw'. That is, block information whose ID is unused is obtained from among block information Imap1~Imap16 relating to the blocks in the information management area 11I. It is assumed that a block 3 is detected as a vacant block and block information Imap 3 is obtained (step S91).

The file ID "0000h" of the original management information Io is entered in the obtained block information Imap 3, and the block managed by the corresponding block information is secured as a block in which a new file should be stored (step S92).

Then, "FFF0h" is written in the mode RBmod of the block 3 in the file flash 11, in which the original management information Io should be written, thereby indicating that the original management information is being updated (step S93).

Then, the new management information Iw' on the work memory is written in the block 3. This writing is carried out according to the file writing flow F2 (step S94).

When the writing into the block 3 has ended, the old original management information Io is erased according to the file erasing flow F1 (step S95).

Hereinafter, steps S81~S86 mentioned above are referred to as a management information updation flow F4.

While in this first embodiment the method of replacing the contents of the original management information Io with the contents of the new file is described, updation of the backup management information Ib is also carried out according to the management information updation flow F4. Further, since the original management information Io and the backup management information Ib stored in the file flash 11 have the same contents, even when the original management information Io is replaced with the backup management information Ib that is read from the file flash 11, the contents of the file does not change before and after the updation.

When it is judged in step S1003 that the original management information Io is not being erased or updated and the file in the data file area 11D is not being written, the previous updation of the original management information Io has normally ended, and therefore, the file management unit 13 judges whether or not the file in the data file area 11D is being written or erased, on the basis of the mode RBmod. When the value of the mode RBmod that is obtained by majority judgement as in step S1002 is "F000h" or "FF00h", the file management unit 13 judges that the file in the data file area 11D is being written or erased. When the file is not being written or erased, the file management unit 13 goes to step S1008 (step S1006).

Figure 14:
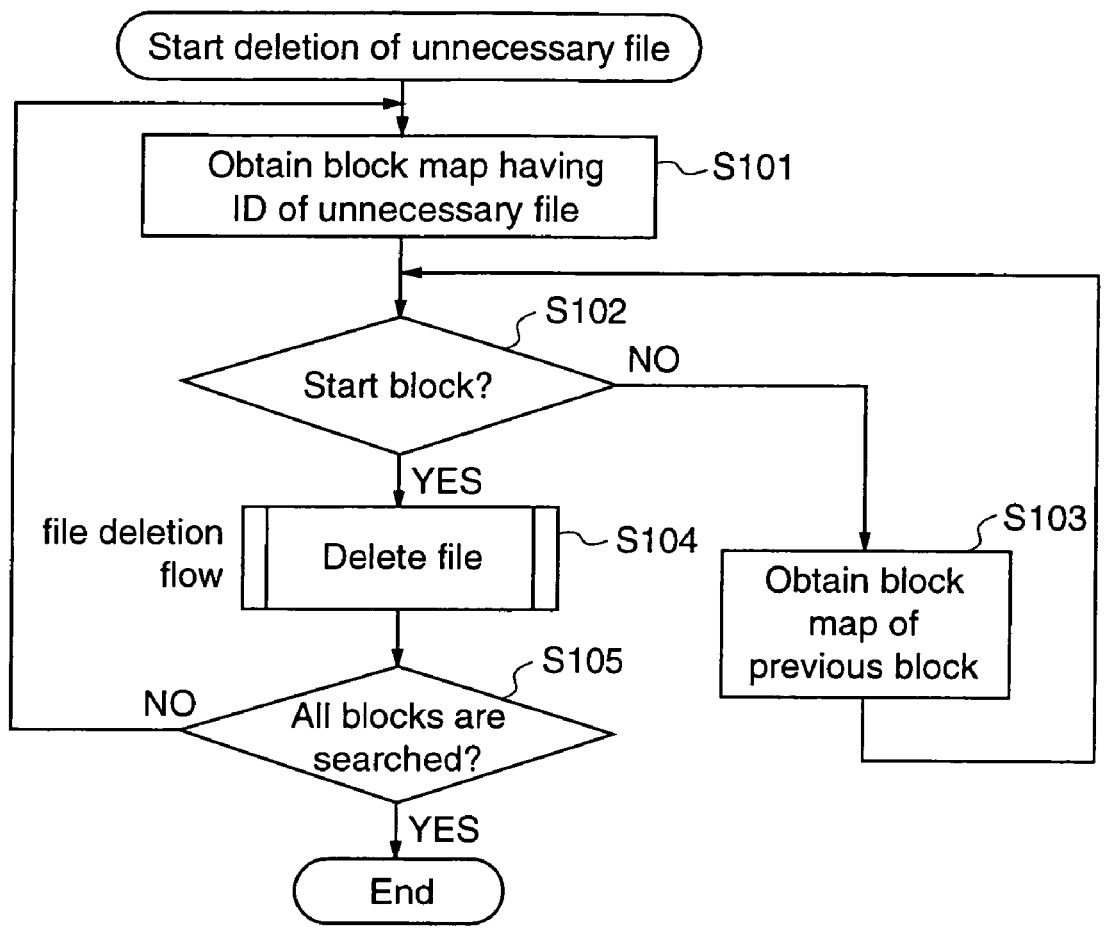
FIG. 14 is a flowchart for explaining a method for erasing a file which is being written or erased, from the file flash, by the memory management apparatus according to the first embodiment of the present invention.

When the file in the data file area 11D is being written or erased, the file being written or erased is erased from the file flash 11 by the method shown in FIG. 14 (step S1007).

In order to erase the file being written or erased, the file management unit 13 compares the IDs described in the file information If1~Ifn of the management information Iw with the IDs entered in the block information Imap1~Imap1024, and searches for block information having an ID that is not entered in the file information If1~Ifn (step S101).

Next, the file management unit 13 judges whether or not the obtained block information relates to the start block of the file, on the basis of the previous-block number described in the block information. When the block of the obtained block information is the start block, "FFFFh" is described in the "previous-block number". When it is not the start block, the number of a block that contains the forward portion of the file is described in the "previous-block number". Assuming that the block information ImapBN relating to the block BN is obtained in step S101, when the previous-block number of the block information ImapBN is "FFFFh", the block BN is the start block (step S102).

When a block number is described in the "previous-block number", block information of this block is obtained. For example, when "BN-1" is described in the "previous-block number", block information ImapBN-1 is obtained, and the processing returns to step S102 (step S103).

After obtaining the start block number in step S102, the file management unit 13 executes the file erasing flow F1 to erase the file (step S104).

When the above-mentioned searching has been done for the IDs entered in the block information of all of the blocks, the processing is ended. When unsearched block information remains, the processing returns to step S101 (step S105).

After the file being written or erased is erased as described above, the processing goes to step S1008.

After reading the original management information Io into the work memory 14, the file management unit 13 executes the file reading flow F3 to read the backup management information Ib into the work memory 14 (step S1008).

Next, the file management unit 13 judges whether the previous file writing into the file flash 11 has normally ended or not, on the basis of the mode RBmod of the block that contains the backup management information Ib. The file management unit 13 determines that the data updation has normally ended when the value of the mode RBmod obtained by the majority judgement in step S1002 is "0000h", and ends the processing (step S1009).

On the other hand, when it is judged in step S1009 that the data updation has not normally ended, the file management unit 13 writes the contents of the management information Iw on the work memory 14, which is read in step S1001, into the block in which the backup management information Ib of the file flash 11 is stored. This updation of the backup management information Ib is carried out according to the management information updation flow F4 (step S1010).

After reading the original management information Io and the backup management information Ib from the file flash 11 into the work memory 14, the file management unit 13 transfers the program file and data file stored in the data file area 11D of the file flash 11 to the work memory 14 according to the file management information If of the management information Iw and the description of the block map Imap. That is, the file management unit 13 executes the reading flow F2 for the respective files described in the file information If17~Ifn.

When this booting is ended, the information processing unit 30 reads the program transferred to the work memory 14, from the beginning, to execute the processing of the program.

The information processing unit 30 instructs the file management unit 13 to erase the file in the file flash 11 when the file becomes unnecessary as the program is executed. Further, when a new file is generated, the information processing unit 30 outputs the new file to the work memory 14, and instructs the file management unit 13 to write the new file.

Next, the operation of the memory management apparatus 10 when it is instructed by the information processing unit 30 to erase, write, and read of a file.

Figure 6:
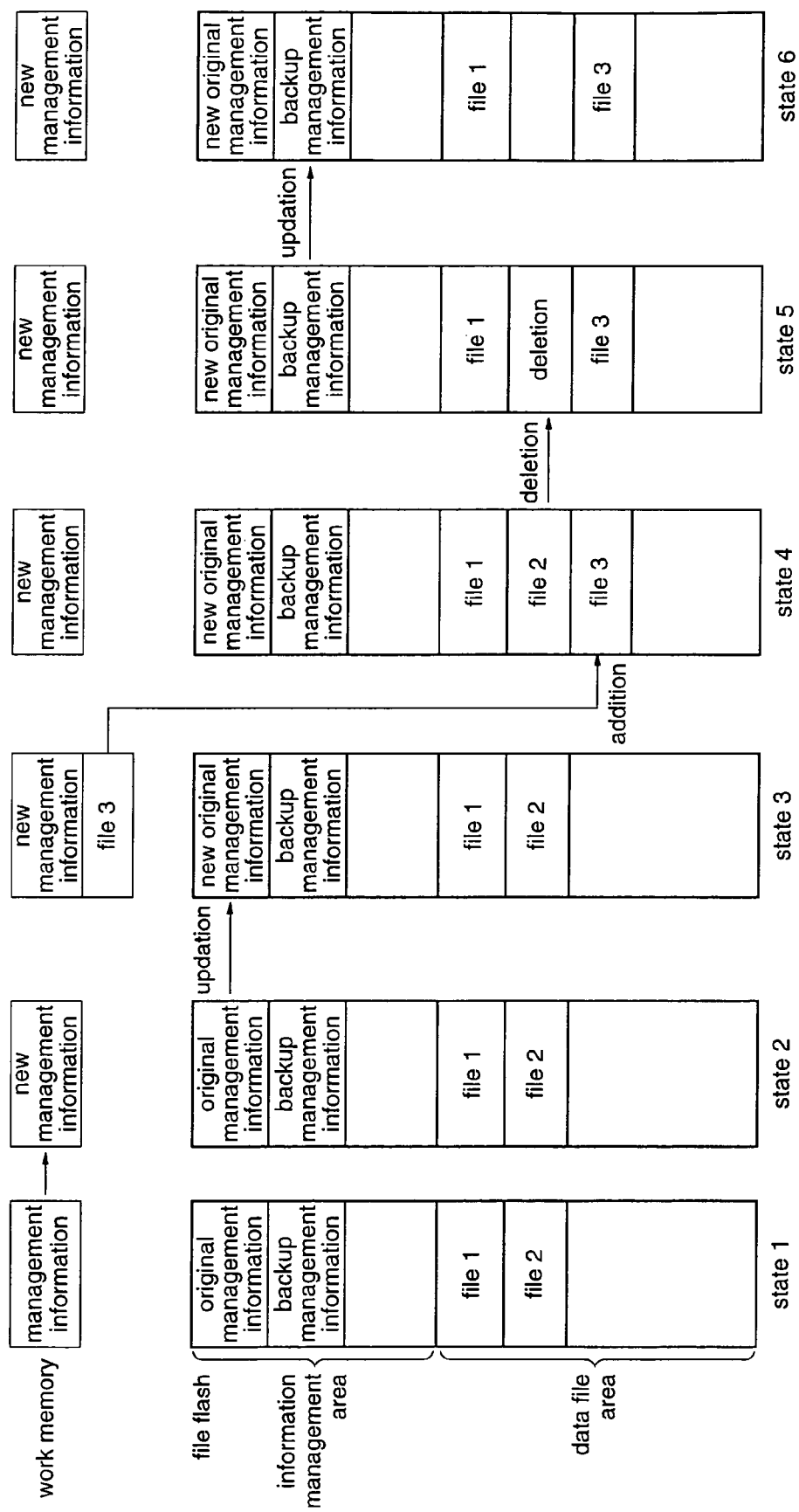
FIG. 6 is a diagram for explaining a procedure of updating a file 2 to a file 3 by the information processing apparatus according to the first embodiment of the present invention.
Figure 17:
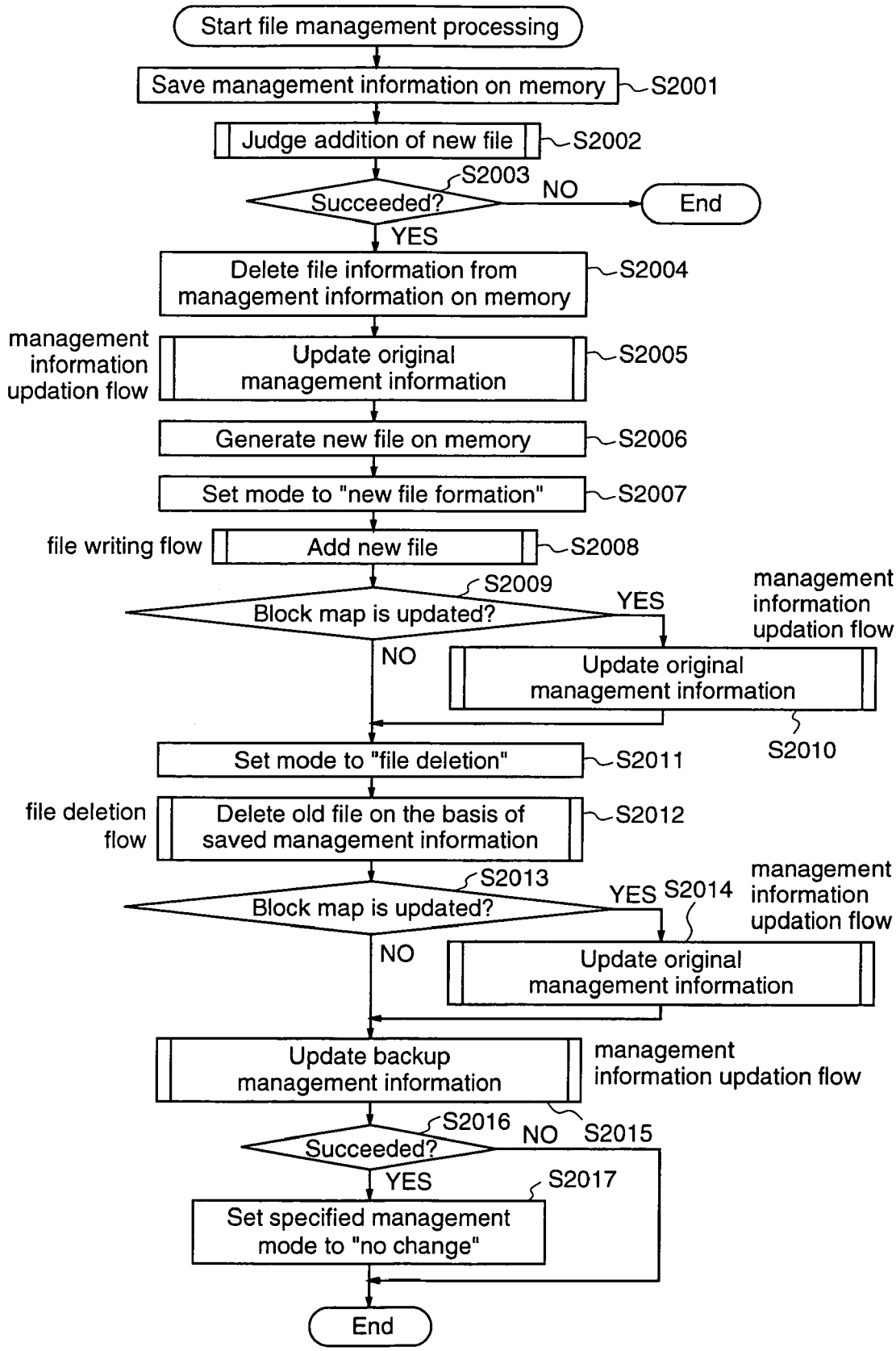
FIG. 17 is a flowchart for explaining a method for updating a file 2 to a file 3 in the file flash by the memory management apparatus according to the first embodiment of the present invention.

Hereinafter, a description will be given of the case where a file 2 stored in the data file area 11D of the file flash 11 is updated to a file 3. FIG. 6 is a diagram illustrating the procedure of updating the file 2 to the file 3 with respect to plural states of the file flash 11, and FIG. 17 is a flowchart for explaining the method of updating the file 2 to the file 3.

In the file flash 11 before file updation is performed (state 1), the original management information Io and the backup management information Ib are stored in the information management area 11I, and the files 1 and 2 are stored in the data file area 11D. Further, in the work memory 14, the management information Iw having the same constants as the original management information Io and the backup management information Ib stored in the file flash 11.

In state 2, the management information Iw on the work memory 14 is updated.

Initially, the file management unit 13 copies the management information Iw, and saves the copy of the management information Iw in an area having no data in the work memory 14 (step S2001).

Figure 18:
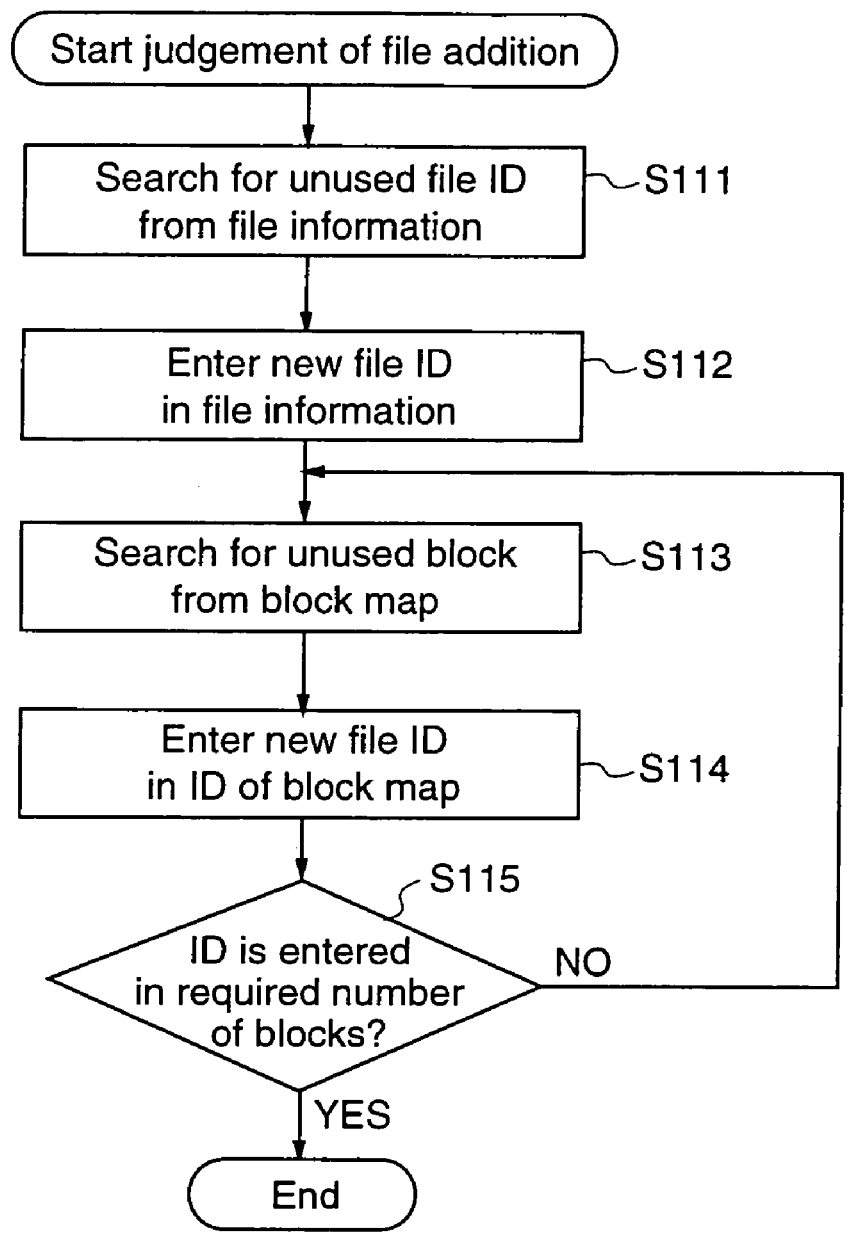
FIG. 18 is a method for judging whether a new file can be added or not, by the memory management apparatus according to the first embodiment of the present invention.

Then, the file management unit 13 judges whether a new file can be added to the file flash 11 by the method shown in FIG. 18, and enters the file ID of the new file in the management information Iw (step S2002).

In order to judge as to whether a new file can be added or not, initially the file management information If of the management information Iw is searched to obtain file information whose ID is unused (step S111).

Then, the file ID of the new file to be added is entered in the ID of the obtained file information, and the new file is assigned to this file information (step S112).

Next, the block map Imap of the management information Iw is searched for block information of a vacant block whose ID is unused (step S113).

Then, the file ID of the new file is entered in the ID of the obtained block information, and the block managed by this block information is secured as a block in which the new file should be stored. Further, when the data to be stored in this block is a portion of the file, the previous-block number and the subsequent-block number are also described (step S114).

The file management unit 13 judges whether a required number of blocks for storing the new file have been secured or not, and returns to step S113 when the required number of blocks are not secured yet. On the other hand, when the ID is entered in the required number of blocks, the file management unit 13 ends the processing. Further, the file management unit 13 ends the processing also when the required number of blocks are not secured but there is no vacant space in the data file area 11D of the file flash 11 and the file ID is entered in all of the block information Imap1~Imap1024 (step S115).

The file management unit 13 goes to step S2004 when it judges that the new file can be added into the file flash 11, or ends the processing when it judges that the new file cannot be added (step S2003).

Next, the file information If2 of the file 2 to be erased is erased from the management information Iw. Further, when writing a new file over the existing file, the file information of the existing file should be erased.

In order to erase the file information, initially, the file management unit 13 searches the file management information If to obtain the file information If2 having the file ID of the file 2 to be erased. Then, the file management unit 13 erases the file ID of the file information If2, the start block number, the file size, and the file name. Next, the file management unit 13 searches the block map Imap to obtain the block information of the block in which the file ID of the file 2 is described, and sets the ID at "unused". For example, when the file ID of the file 2 is described in the block BN, the ID of the block information ImapBN is set at "FFFFh". Since the file is sometimes stored over plural blocks, the block information in which the file ID of the file 2 is described is detected from all of the block information possessed by the block map Imap, and the ID is set at "unused". At this time, the information relating to the file 2 is erased from the management information Iw, resulting in new management information Iw' in which information relating to the file 3 is added. This state is "state 2" shown in FIG. 6 (step S2004).

In state 3, the original management information Io is updated. That is, the file management unit 13 erases the original management information Io from the file flash 11, and writes the new management information Iw' in the erased block (in FIG. 6, the original management information after updation is referred to as "new original management information"). Updation of the original management information Io is carried out according to the management information updation flow F4. When writing of the new management information Iw' has failed, it is written into another block (step S2005).

Next, the file 3 having the file ID that is entered in step S2002 is generated in the work memory 14 (step S2006).

This file 3 may be generated by the information processing unit 30 or by another equipment (not shown) connected to the information processing apparatus 100. The file 3 may be generated in a step previous to step S2006.

In state 4, the file 3 generated in step S2006 is written in the file flash 11.

The file management unit 13 writes "FF00h" in the mode RBmod of the block containing the original management information Io in the file flash 11 to indicate that the file is being written in the data file area 11D (step S2007).

After setting the mode RBmod, the file management unit 13 executes the file writing flow F2 to write the file 3 on the basis of the block map that is entered in step S2002 (step S2008).

Next, the file management unit 13 judges whether the block map Imap of the new management information Iw' on the work memory is updated or not, and goes to step S2001 when it is not updated. The block map Imap is updated only when the writing in step S2008 has failed and a defective block is entered (step S2009).

When the block map Imap is updated, the file management unit 13 erases the original management information Io from the file flash 11, and writes the updated new management information Iw' into the erased block. Updation of the original management information Io is carried out according to the management information updation flow F4. When the writing has failed, the new management information Iw' is written in another block (step S2010).

In state 5, the file 2 is erased.

The file management unit 13 writes "F00h" in the mode RBmod of the block containing the original management information Io in the file flash 11, and indicates that the old file in the data file area 11D is being erased (step S2001).

After setting the mode RBmod, the file management unit 13 obtains the ID or start block number of the file 2 on the basis of the management information Iw that is saved in step S2001, and erases the file 2. This erasing is carried out according to the file erasing flow F1 (step S2012).

Next, the file management unit 13 judges whether the block map Imap of the new management information Iw' on the work memory is updated or not, and goes to step S2015 when it is not updated. The block map Imap is updated only when the erasing in step S2012 has failed and thereby a defective block is entered (step S2013).

When the block map Imap is updated, the file management unit 13 erases the original management information Io of the file flash 11, and writes the updated management information Iw' (management information for correction in step S25) into the erased block. This updation of the original management information Io is carried out according to the management information updation flow F4. When the writing has failed, the new management information Iw' is written into another block (step S2014).

In state 6, the backup management information Ib is updated. That is, the file management unit 13 erases the backup management information Ib from the file flash 11, and writes new management information Iw' in the erased block. (In FIG. 6, the backup management information after updation is referred to as "new backup management information.) This updation of the backup management information Ib is carried out according to the management information updation flow F4. When the writing has failed, the new management information Iw' is written in another block (step S2015).

The file management unit 13 goes to step S2017 when the updation of the backup management information Ib has completed, or ends the processing when the updation has failed (step S2016).

When all of the processings for updating the file 2 to the file 3 have completed, the file management unit 13 writes "0000h" in the mode RBmod of the block that contains the original management information Io and the backup management information Ib, thereby indicating that the data updation has normally ended (step S2017).

Figure 19:
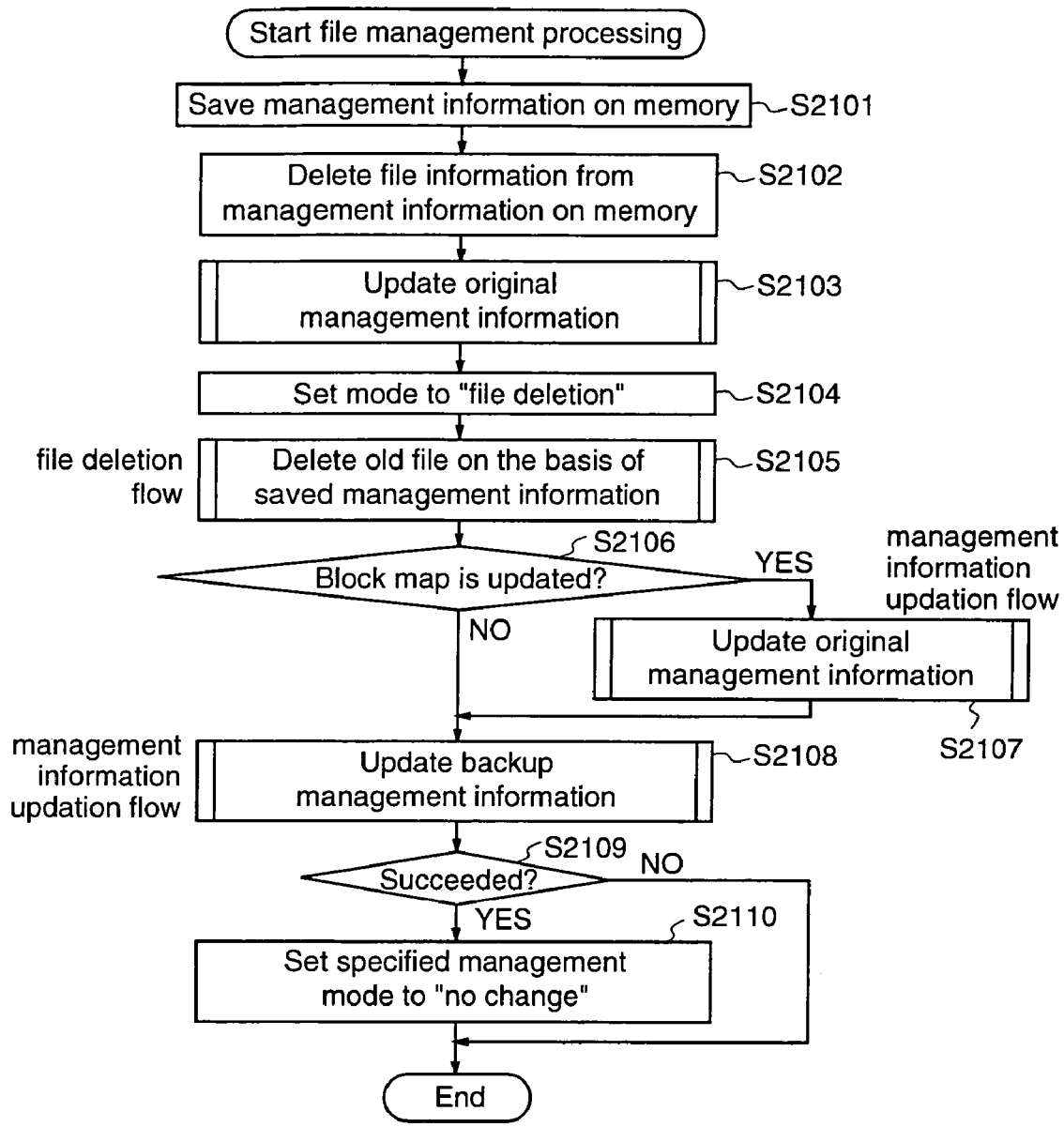
FIG. 19 is a flowchart for explaining a method for erasing a file from the file flash by the memory management apparatus according to the first embodiment of the present invention.

Next, a method for erasing a file stored in the data file area 11D of the file flash 11 will be described taking erasing of file 2 as an example. FIG. 19 is a flowchart for explaining the file erasing method.

When erasing the file 2 stored in the file flash 11, initially the file management unit 13 copies the management information Iw, and saves the copy in an area having no data in the work memory 14 (step S2101).

Next, the file information If2 of the file 2 to be erased is erased from the management information Iw. The file management unit 13 erases the file ID, the start block number, the file size, and the file name from the file information If2 having the file ID of the file 2 to be erased. Further, the file management unit 13 searches the block map Imap to obtain the block information in which the file ID of the file 2 is described, and sets the ID of the block map at "unused". At this time, the management information Iw becomes new management information Iw' from which the information relating to the file 2 is erased (step S2102).

The file management unit 13 erases the original management information Io from the file flash 11, and writes the new management information Iw' into the erased block. This updation of the original management information Io is carried out according to the management information updation flow F4. When the writing of the new management information Iw' has failed, the new management information Iw' is written in another block (step S2103).

Then, the file management unit 13 writes "F000h" in the mode RBmod of the block that contains the original management information Io in the file flash 11, thereby indicating that the old file in the data file area 11D is being erased (step S2104).

After setting the mode RBmod, the file management unit 13 obtains the ID or start block number of the file 2 on the basis of the management information Iw that is saved in step S2101, and erases the file 2. This erasing is carried out according to the file erasing flow F1 (step S2105).

Next, the file management unit 13 judges whether the block map Imap of the new management information Iw' on the work memory has been updated or not, and goes to step S2108 when it is not updated. The block map Imap is updated only when the erasing in step S2105 has failed and thereby a defective block is entered (step S2106).

When the block map Imap is updated, the file management unit 13 erases the original management information Io from the file flash 11, and writes the updated management information Iw' (management information for correction in step S25) in the erased block. This updation of the original management information Io is carried out according to the management information updation flow F4. When the writing has failed, the new management information Iw' is written in another block (step S2107).

Next, the backup management information Ib is updated. That is, the file management unit 13 erases the backup management information Ib from the file flash 11, and writes the new management information Iw' in the erased block. This updation of the backup management information Ib is carried out according to the management information updation flow F4. When the writing of the new management information Iw' has failed, it is written in another block (step S2108).

The file management unit 13 goes to step S2110 when the updation of the backup management information Ib has ended, or ends the processing when the updation has failed.

When all of the processings for erasing the file 2 have completed, the file management unit 13 describes "0000h" in the mode RBmod of the block that contains the original management information Io and the backup management information Ib, thereby indicating that the data updation has normally ended (step S2110).

Figure 20:
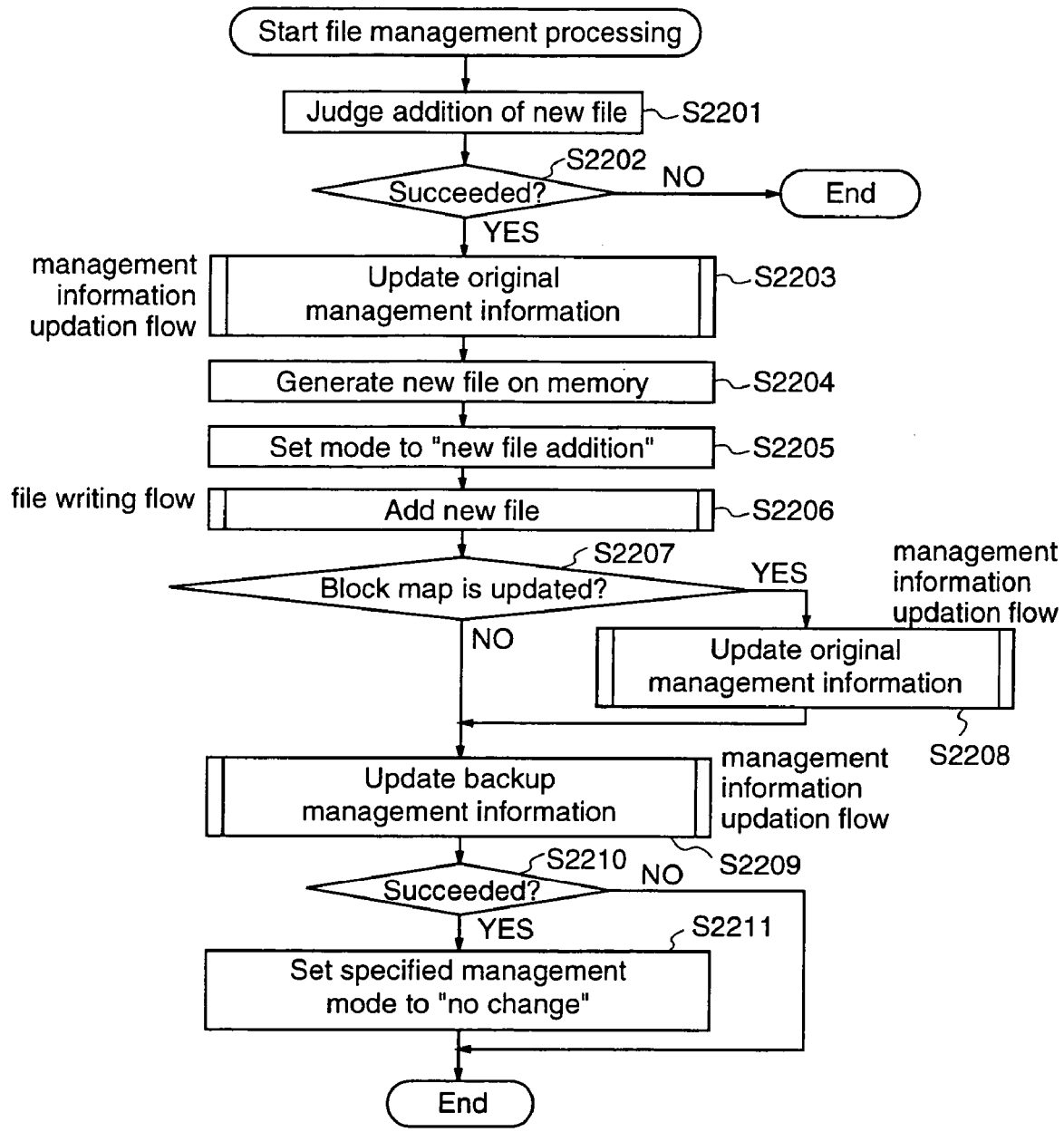
FIG. 20 is a flowchart for explaining a method for adding a file in the file flash by the memory management apparatus according to the first embodiment of the present invention.

Next, a method for adding a new file in the data file area 11D of the file flash 11 will be described taking addition of file 2 as an example. FIG. 20 is a flowchart for explaining the file addition method.

When adding the file 2 to the file flash 11, initially the file ID of the new file is entered in the management information Iw on the work memory 14, and it is judged whether the new file can be added to the file flash 11 or not. The file management unit 13 searches the file management information If of the management information Iw to obtain file information whose ID is unused. Then, the file ID of the new file to be added is entered in the ID of the obtained file information, and this file information is assigned to the new file. Further, the block map Imap is searched for block information of a vacant block whose ID is unused. Then, the file ID of the new file is entered in the ID of the obtained block information, and the block managed by this block information is secured as a block for storing the new file.

Further, when the data stored in this block is a portion of the file, the previous block number and the subsequent block number are also described. At this time, the management information Iw becomes new management information Iw' where the information relating to the file 2 to be added is described (step S2201).

The file management unit 13 goes to step S22 when it is judged that the new file can be added, or ends the processing when the new file cannot be added to the file flash 11 (step S2202).

The file management unit 13 erases the original management information Io from the file flash 11, and writes the new management information Iw' in the erased block. This updation of the original management information Io is carried out according to the management information updation flow F4.

When the writing of the new management information Iw' has failed, the new management information Iw' is written in another block (step S2203).

Next, the file 2 having the file ID entered in step S2001 is generated in the work memory 14 (step S2204). This file 2 may be generated by the information processing unit 30 or another equipment (not shown) connected to the information processing unit 100. Further, the file 2 may be generated in a step previous to step S2204.

The file management unit 13 writes "FF00h" in the mode RBmod of the block that contains the original management information Io of the file flash 11, thereby indicating that the file is being written in the data file area 11D (step S2205).

After setting the mode RBmod, the file management unit 13 executes the file writing flow F2 to write the file 2 on the basis of the block map that is entered in step S2201 (step S2206).

Next, the file management unit 13 judges whether the block map Imap of the new management information Iw' on the work memory has been updated or not, and goes to step S2209 when it is not updated. The block map Imap is updated only when the writing in step S2206 has failed and thereby a defective block is entered (step S2207).

When the block map Imap is updated, the file management unit 13 erases the original management information Io from the file flash 11, and writes the updated management information Iw' in the erased block. This updation of the original management information Io is carried out according to the management information updation flow F4. When the writing has failed, the new management information Iw' is written in another block (step S2208).

Next, the backup management information Ib is updated. That is, the file management unit 13 erases the backup management information Ib from the file flash 11, and writes the new management information Iw' in the erased block. This updation of the backup management information Ib is carried out according to the management information updation flow F4. When the writing of the new management information Iw' has failed, the new management information Iw' is written in another block (step S2209).

The file management unit 13 goes to step S2211 goes to step S2211 when the updation of the backup management information Ib has completed, or ends the processing when the updation has failed (step S2210).

When the processing of adding the file 2 has completed, the file management unit 13 describes "0000h" in the mode RBmod of the block containing the original management information Io and the backup management information Ib, thereby indicating that the data updation has normally ended (step S2211).

As described above, the information processing apparatus 100 according to the first embodiment is provided with the memory management unit 10 for holding program files and data files, and the information processing unit 30 for performing processing on the basis of the program files and data files supplied from the memory management unit 10, and the memory management unit 10 is provided with the file flash 11 for storing the program files and the data files, the file management unit 13 for managing the files stores in the file flash 11, the work memory 14 as a work area of the information processing unit 30, the flash I/F 12 for enabling the file management unit 13 to access the file flash 11, and the boot flash 15 for storing boot program. Therefore, the information processing unit 30 can execute the program transferred onto the work memory 14, and is prevented from reading the program for every step from the file flash 11 when executing the processing. Consequently, the processing speed of the information processing unit 30 is increased, resulting in a considerable reduction in the execution time.

Further, the file management unit 13 generates the new management information Iw' for performing erasing and writing from/into the file flash 11 by updating the management information Iw transferred to the work memory 14, updates the contents of the original management information Io in the file flash 11 to the contents of the new management information Iw', performs erasing and writing of files and blocks from/into the file flash 11 on the basis of the new management information iw', and updates the contents of the backup management information Ib in the file flash 11 to the contents of the new management information Iw'. Therefore, a block to be a target of writing or erasing into/from the file flash 11 can be determined by the file management unit 13. Further, because erasing or writing from/into a file or block is carried out after the original management information Io is written in the file flash 11, the file in the middle of erasing or writing can be detected and erased by the file management unit 13 when the processing is interrupted before all of the processings are completed. Further, because the backup management information Ib is written after the original management information Io is written, the backup management information Ib can be recovered using the original management information Io when erasing or writing of the backup management information Ib is interrupted.

Further, the redundant area in each page is assigned the mode RBmod indicating the updation state of the data area, the validity information RBval indicating whether a problem occurs during updation of data in a block or not, the page writing state RBwr indicating whether the block is used or not, the block defective/non-defective information RBbd indicating whether the block is a defective block having a problem or not, the page writing state RPwr indicating whether the page is used or not, and the ECC information RPecc containing ECC data in the data area. Therefore, the memory management unit 13 can grasp various states of the file flash 11 to perform processings according to the states.

Further, the memory management unit 13 assigns a binary value to the indication value in each area in the redundant area by performing majority judgement for every four bits. Therefore, even when false writing is made into the redundant area, the memory management unit 13 can grasp the state presented by the indication value.

Further, the memory management unit 13 performs majority judgement for the indication values that are indicated over plural pages of a block, and determines the plural indication values as the values indicating the block. Therefore, even when false writing is made into the redundant area, the memory management unit 13 can grasp the state presented by the indication values.

Further, since the file flash 11 is implemented by a serial flash memory such as a NAND type flash memory or an AND type flash memory, the file flash 11 can perform erasing in a time about one-hundredth of the erasing time of a NOR type flash memory, and writing in a time about one-twentieth of the writing time of the NOR type flash memory. Further, since the serial flash memory has a large storage capacity and is highly integrated, the footprint of the information processing apparatus 100 can be reduced.

While in this first embodiment the value of the mode RBmod is determined according to whether "0" is written in three or more bits among the divided four bits of the mode RBmod, the value of the mode RBmod may be determined according to whether "0" is written in all of the four bits. The four-bit value is set at "0h" when "0" is written in all of the four bits while it is set at "Fh" when there is any bit in which "0" is not written, thereby to determine the four values of the mode RBmod.

Since the value of the mode RBmod is determined according to whether "0" is written in all of the four bits, the state represented by the indication value can be grasped only when false writing or garbled bits is/are not occurring in the redundant area, whereby more precise judgement can be carried out, resulting in an increase in reliability of data to be read to the work memory 14.

Furthermore, in this first embodiment, the mode RBmod is provided over three pages from the beginning of each block, and the flag is written over the same area as the state of processing proceeds. However, the respective states may be assigned to the modes RBmod of the assigned pages, and the flag may be written into the modes RBmod of the respective pages as the state of processing proceeds.

For example, as for the mode RBmod, the state before processing is defined as "FFFFh" while the state where various kinds of processings have ended is defined as "0000h", and "updation of management information" may be assigned to the mode RBmod4 of page 4, "addition of file" to the mode RBmod3 of page 3; "erasing of file" to the mode RBmod2 of page 2, and "a state where updation of data has normally ended" to the mode RBmod1 of page 1.

In this case, the file management unit 13 writes "0000h" in the mode RBmod4 of page 4 when updating the original management information Io or the backup management information Ib of the file flash 11. Further, the file management unit 13 writes "0000h" in the mode RBmod3 of page 3 when writing a file in the file flash 11, and writes "0000h" in the mode RBmod2 of page 2 when erasing the file. When all of the processings have completed, the file management unit 13 writes "0000h" in the mode RBmod1 of page 1. Since the processing such as file addition or erasing is always carried out after updation of the original management information Io, when writing "0000h" in modes RBmod3~RBmod1 of pages 3, 2, and 1, respectively, "0000h" has already been described in the mode RBmod4 of page 4. However, since there are cases where file addition is not carried out before file erasing, the mode RBmod3 of page 3 may be either "0000h" or "FFFFh" when writing "0000h" in mode RBmod2 of page 2. Further, since there are cases where the processing is only updation of management information, the mode RBmod2 (RBmod3) of page 2 (page 3) may be either "0000h" or "FFFFh" when writing "0000h" in mode RBmod1 of page 1.

The values of the modes RBmod which are described as above are used when judging the state of processing for the block, or the original management information Io, or the backup management information Ib stored in the file flash 11, in step S1002 or S1004. That is, the file management unit 13 initially judges whether "0" is written in three or more bits among the divided four bits or whether "0" is written in all of the four bits, and assigns the four bits to "0h" or "Fh" on the basis of the result of judgement, thereby judging the value of each page. Then, the file management unit 13 determines a page in which "0000h" is described, thereby judging the state of the processing.

As described above, the respective states of processing are assigned to predetermined pages, and "0000h" is written in the assigned pages as the processing proceeds, whereby the number of writings into the mode RBmod in the same page is reduced, and durability of the file flash 11 is kept.

Figure 21:
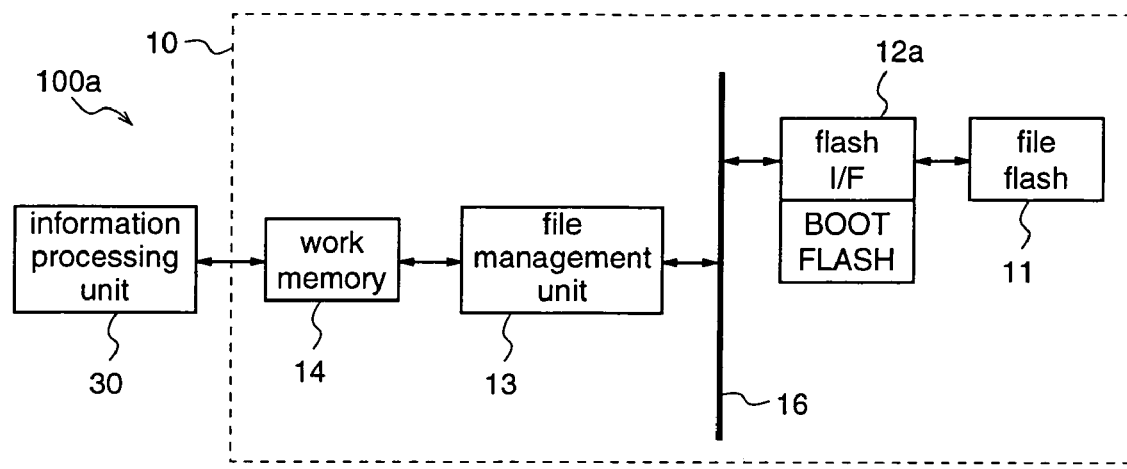
FIG. 21 is a block diagram illustrating another example of an information processing apparatus according to the first embodiment of the present invention.

Further, while in this first embodiment the memory management apparatus 10 uses the boot flash 16 and the flash I/F 12 which are independent chips, the memory management apparatus 10 may use an interface 12a having the functions of a flash I/F and a boot flash on a single chip as shown in FIG. 21.

By using the interface 12a having the functions of a flash I/F and a boot flash, it is possible to reduce the footprint, unit price of chip, and manufacturing processing of the memory management apparatus 10a, resulting in streamlining of cost. Further, since processing can be carried out with the flash I/F and the boot flash being the same address space in the file management unit 13, it is possible to develop a program which does not discriminate between the flash I/F and the boot flash.

Further, while in this first embodiment the file flash 11 is implemented by a serial flash memory of one chip construction, it may be implemented by a plurality of serial flash memories.

Figure 22:
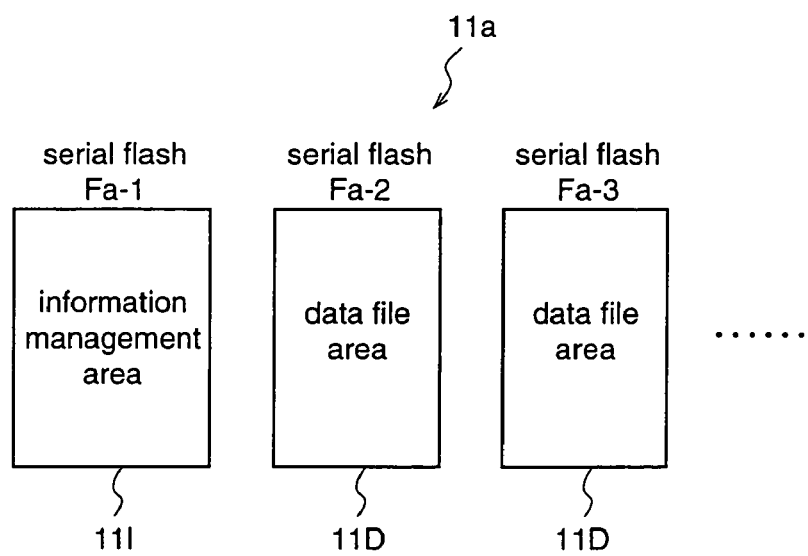
FIG. 22 is a schematic diagram illustrating another example of a file flash of the information processing apparatus according to the first embodiment of the present invention.

To be specific, as shown in FIG. 22, a file flash 11a may be constituted by three serial flashes Fa-1~Fa-3, and an information management area 11I containing management information of all files stored in the file flash 11a is allocated to the serial flash Fa-1 while a series of data file areas 11D are constituted by the remaining serial flashes Fa-2 and Fa-3. Although the file flash 11a is constituted by three serial flashes, the number of serial flashes is not restricted thereto. The file flash 11a may be constituted by an arbitrary number (N) of serial flashes. By giving serial numbers to the serial flashes Fa-1~Fa-N, the file management unit 13 can perform processing without discriminating between the respective serial flashes.

Thereby, the memory management apparatus can cope with an increase in the size of a program file or data file. Further, since the capacities of the respective serial flashes can be made different from each other, a serial flash having an optimum capacity for the size of the program file or data file can be adopted, resulting in a reduction in footprint and a reduction in manufacturing cost.

Figure 23:
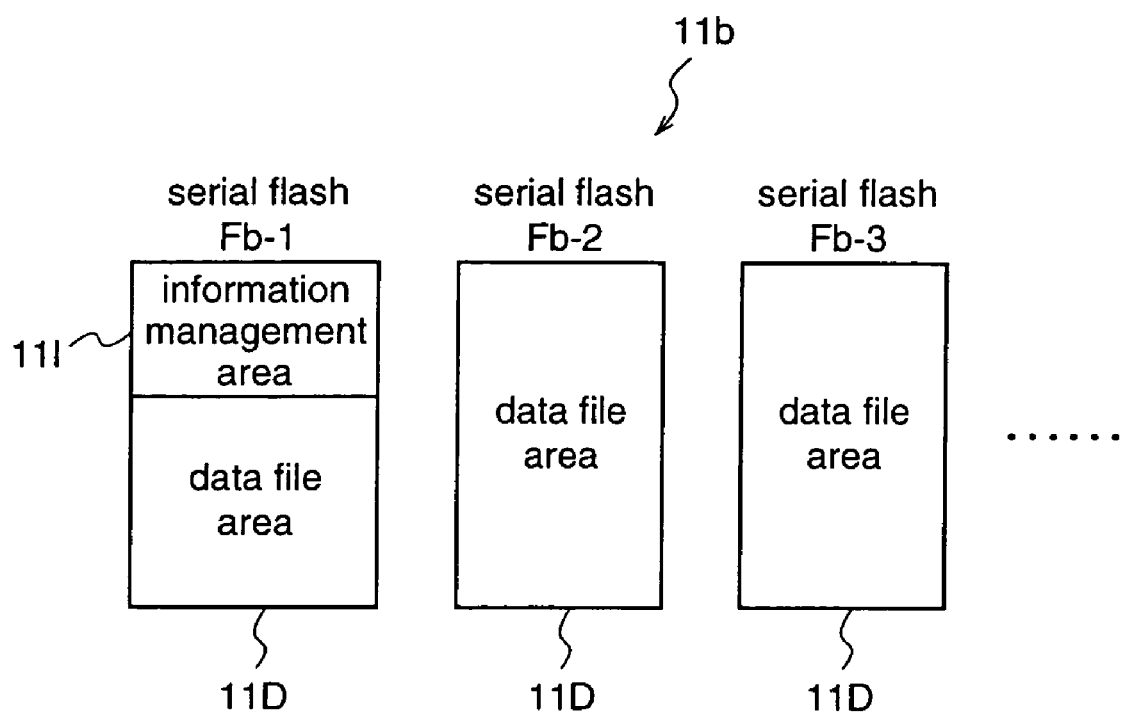
FIG. 23 is a schematic diagram illustrating another example of a file flash of the invention processing apparatus according to the first embodiment of the present invention.

Further, as shown in FIG. 23, a file flash 11b may be constituted by three serial flashes Fb-1~Fb-3, and an information management area 11I containing management information of all files stored in the file flash 11b may be allocated from the beginning of the serial flash Fb-1, and a series of data file areas 11D may be formed from the end of the information management area 11I of the serial flash Fb-1 to the serial flash Fb-3. While in FIG. 23 the file flash 11b is constituted by three serial flashes, the number of serial flashes constituting the file flash 11b is not restricted thereto. The file flash 11b may be constituted by an arbitrary number (N) of serial flashes. By giving serial numbers to the serial flashes Fb-1~Fb-N, the file management unit 13 can perform processing without discriminating between the respective serial flashes.

Thereby, the memory management unit can cope with an increase in the size of a program file or data file. Further, since the capacities of the respective serial flashes can be varied from each other, a serial flash having an optimum capacity for the size of the program file or data file can be adopted, resulting in a reduction in footprint and a reduction in manufacturing cost.

Figure 24:
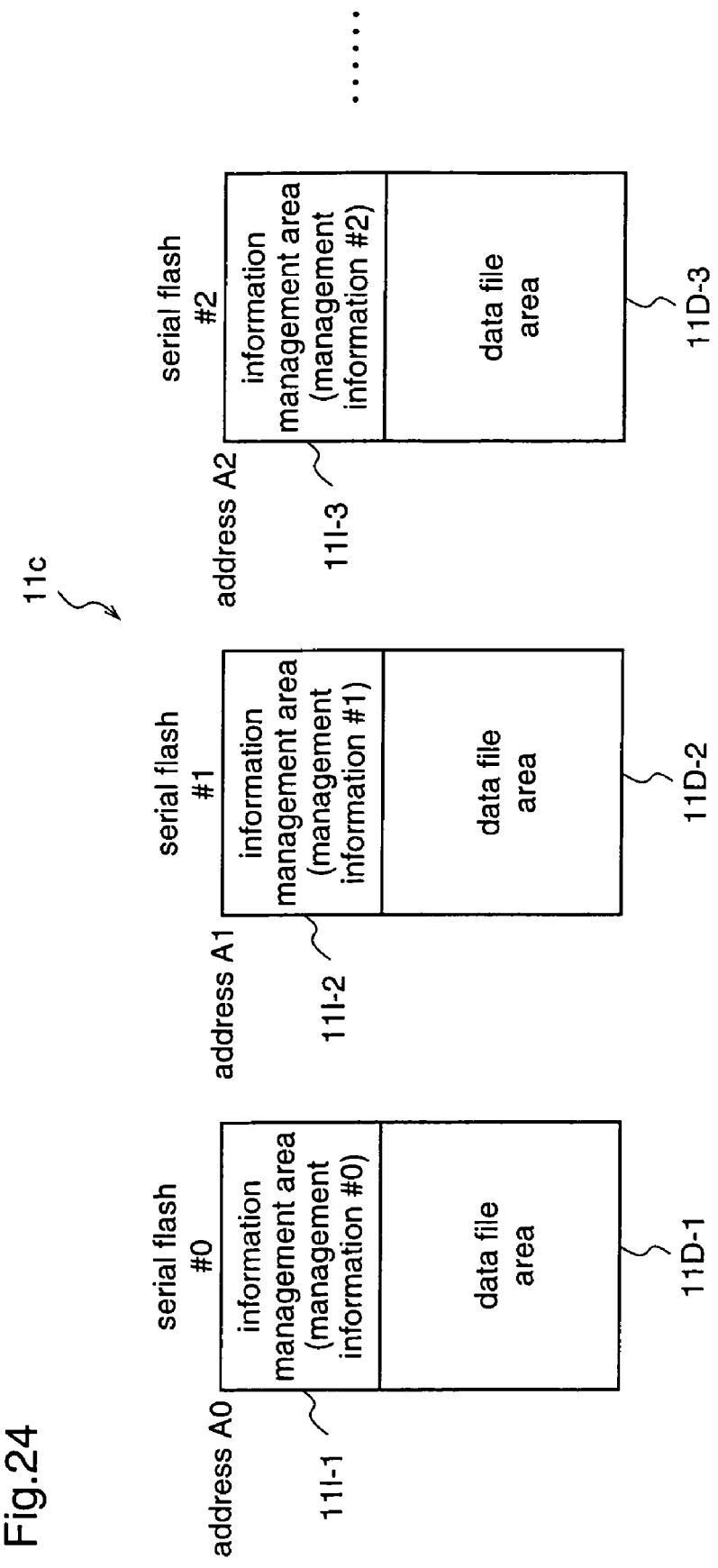
FIG. 24 is a schematic diagram illustrating another example of a file flash of the information processing apparatus according to the first embodiment of the present invention.

Further, a file flash 11c may be constituted by plural serial flashes, and a flash number and an address may be given to each file flash, and an information management area for storing management information of files stored in the corresponding serial flash and a data file area may be assigned to each serial flash. FIG. 24 shows an example of a file flash 11c comprising three serial flashes #00~#2 (#00~#2: flash numbers). The respective file flashes #00~#2 are given addresses A0~A2, information management areas 11I-1~11I-3 for storing management information #00~#2, and data file areas 11D-1~11D-3, respectively. Each of the respective management information #00~#2 corresponds to the original management information Io and backup management information Ib stored in the information management area 11I of the file flash 11. Although the file flash 11c is constituted by three serial flashes, the number of serial flashes constituting the file flash 11c is not restricted thereto. The file flash 11c may be constituted by an arbitrary number (N) of serial flashes.

Figure 25:
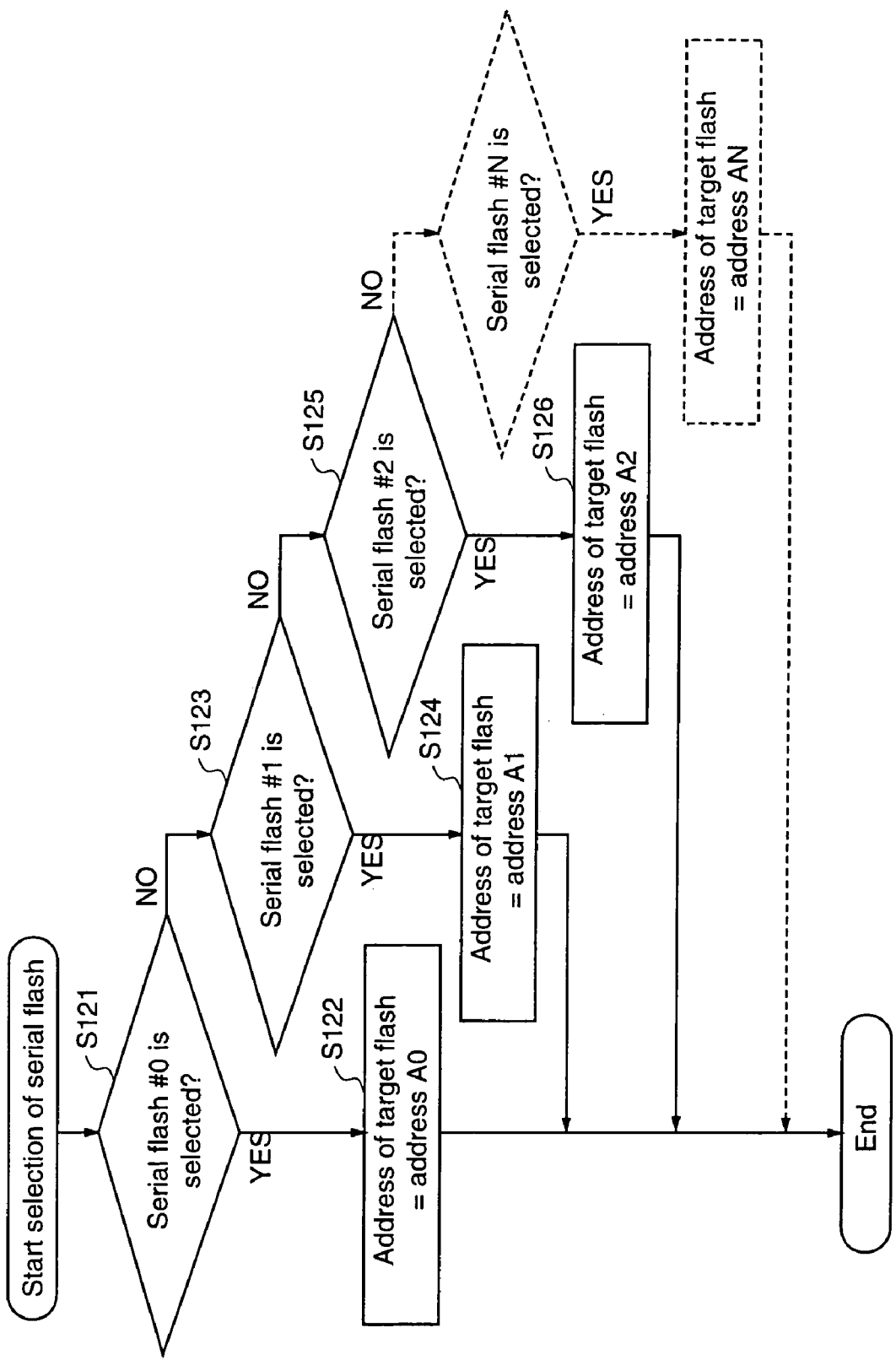
FIG. 25 is a flowchart for explaining a method for selecting a serial flash in the file flash shown in FIG. 24.

When such file flash 11c is adopted, it is necessary to select, before performing booting, a serial flash to be used. FIG. 25 is a flowchart for explaining the serial flash selection.

When selecting serial flashes, initially, the file management unit 13 judges whether the serial flash #0 is selected or not according to an application in which a flash number to be selected is specified (step S121). When the serial flash #0 is selected, the address of the target serial flash is set at address A0 (step S122). When the serial flash #0 is not selected, it is judged whether the serial flash #1 is selected or not (step S123). When the serial flash #1 is selected, the address of the target serial flash is set at address A1 (step S124). When the serial flash #1 is not selected, it is judged whether the serial flash #2 is selected or not (step S125). When the serial flash #2 is selected, the address of the target serial flash is set at address A2 (step S126). When the file flash 11c is constituted by N pieces of serial flashes, flash numbers to be selected are judged in ascending order as described above, thereby selecting the serial flashes.

After performing selection of serial flashes as described above, the file management unit 13 performs processing using the selected file flashes.

As described above, the file flash 11c is constituted by plural file flashes, and each serial flash is assigned an information management area for storing management information of files stored in the serial flash and a data file area, whereby replacement of the file flash becomes possible.

Embodiment 2

Next, an information processing apparatus of the second, fourth, and sixth to eighth aspects the present invention will be described as a second embodiment, with reference to the drawings.

Figure 26:
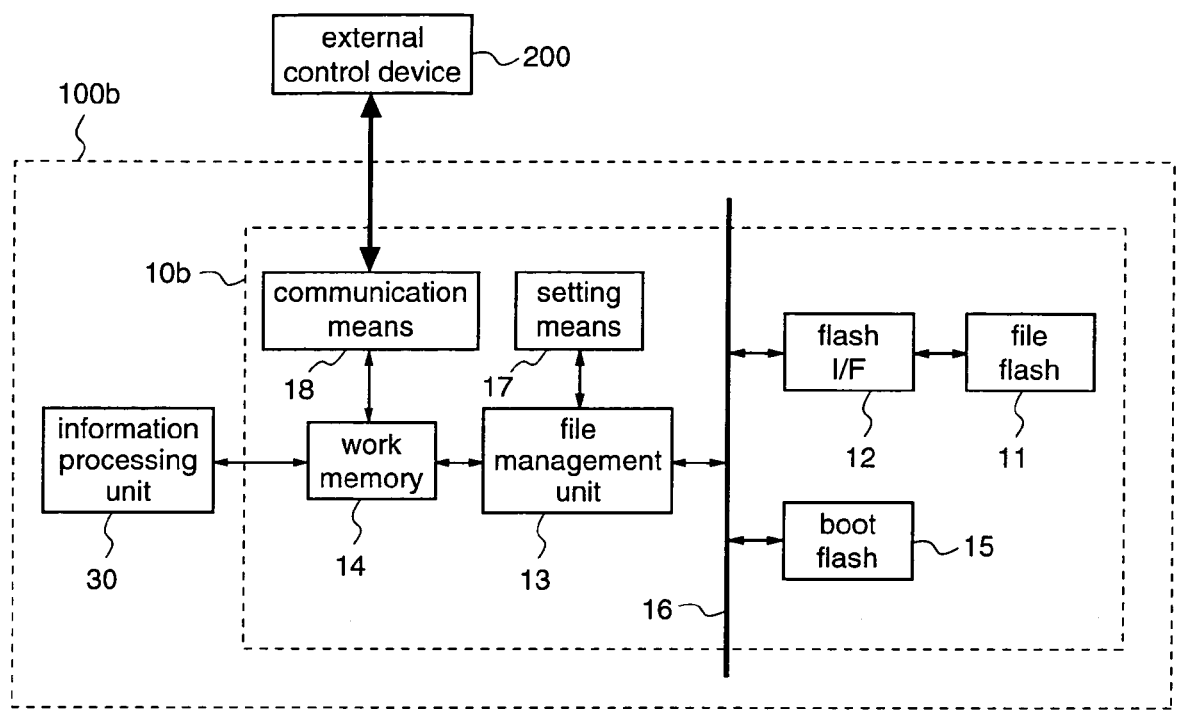
FIG. 26 is a block diagram illustrating the construction of an information processing apparatus according to a second embodiment of the present invention.

FIG. 26 is a block diagram illustrating the construction of an information processing apparatus according to the second embodiment. In FIG. 26, since the same reference numerals as those shown in FIG. 1 designate the same or corresponding parts, repeated description is not necessary.

With reference to FIG. 26, a memory management unit 10b in an information processing apparatus 100b according to the second embodiment is provided with a setting means 17 for setting an operation at boot-up, and a communication means 18 for making communication with an external control apparatus 200 that is provided outside, in addition to the constituents of the memory management unit 10 of the information processing apparatus 100 according to the first embodiment. The file flash 11 a self-diagnostic program for performing self-diagnostic check of the information processing apparatus 100b and a main program for operating the information processing apparatus 10b, and the boot flash 15 contains a boot program PG1 which defines a procedure of reading the self-diagnostic program stored in the file flash 11 into the work memory 14, a boot program PG2 which defines a procedure of reading the main program stored in the file flash 11 into the work memory 14, and a boot program PG3 which defines a procedure of reading a main program or a self-diagnostic program transferred from the external control apparatus 200 to the work memory 14.

The external control apparatus 200 is an apparatus capable of transferring the main program or the self-diagnostic program to the information processing apparatus 100b, such as a personal computer or a handy phone.

The type of the boot program to be executed by the file management unit 13 at boot-up is set on the setting means 17. For example, the file management unit 13 executes the boot program PG1 in the state 1, the boot program PG2 in the state 2, and the boot program PG3 in the state 3.

Further, each of the boot programs PG1~PG3 has the procedure of reading the original management information Io and the backup management information Ib into the work memory 14, which procedure is described for the first embodiment, before the procedure of reading the main program and the self-diagnostic program into the work memory 14.

Next, the operation of the information processing apparatus 100b constructed as described above will be described.

When the information processing apparatus 100b is booted, the file management unit 13 executes any of the first boot program, the second boot program, and the third boot program according to the setting by the setting means 17.

When the setting by the setting means 17 is state 1, the file management unit 13 executes the boot program PG1. That is, the file management unit 13 reads the original management information Io and the backup management information Ib into the work memory 14 according to steps S1001~S1010 described for the first embodiment, and thereafter, reads the self-diagnostic program stored in the file flash 11 into the work memory 14.

When the setting by the setting means 17 is state 2, the file management unit 13 executes the boot program PG2. That is, like the boot program PG1, the file management unit 13 reads the original management information Io and the backup management information Ib into the work memory 14 according to steps S1001~S1010 described for the first embodiment, and thereafter, reads the main program stored in the file flash 11 into the work memory 14.

Further, when the setting by the setting means 17 is state 3, the file management unit 13 executes the boot program PG3. That is, like the boot program PG1, the file management unit 13 reads the original management information Io and the backup management information Ib into the work memory 14 according to steps S1001~S1010 described for the first embodiment, and thereafter, reads the main program or the self-diagnostic program transferred from the external control apparatus 200 through the communication means 18 into the work memory 14.

Then, the information processing unit 30 executes the processing of the program on the work memory 14.

When the information processing unit 30 performs the processing to generate a new file 4 on the work memory 14, the file management unit 13 transfers the file 4 through the communication means 18 to the external control apparatus 200.

Further, the file management unit 13 writes the file 4 into the file flash 11 on the basis of a command from the information processing unit 30. This writing is carried out according to steps S2201~S2211 described for the first embodiment. That is, the contents of the original management information Io of the file flash 11 is replaced with the contents of the management information Iw describing the information of the file 4, and the file 4 is written in the file flash 11. Then, the contents of the backup management information Ib is replaced with the contents of the management information Iw to end the writing of the file 4.

Furthermore, the file management unit 13 transfers the program file and data file on the work memory 14 through the communication means 18 to the external control apparatus 200, according to a request from the external control apparatus 200 or the information processing unit 30.

Further, when the program on the work memory 14 defines the procedure of obtaining a program from the external control apparatus 200 or when the information processing unit 30 is instructed to obtain a program from the external control apparatus 200, the information processing unit 30 obtains a program file or a data file from the external control apparatus 200 through the communication means 18.

As described above, the information processing apparatus 100*b* according to the second embodiment is provided with the setting means 17 for setting the operation at boot-up, and a communication means 18 for making communication with the external control apparatus 200. Therefore, the information processing apparatus 100*b* can select either the self-diagnostic program or the main program to execute the program. Further, since the information processing apparatus 100*b* can perform self-diagnosis, various kinds of jigs which have conventionally been needed for diagnosis are dispensed with, whereby such jigs for maintenance services are not required to be held for long hours.

Further, since the information processing apparatus 100*b* is connected through the communication means 18 to the external control apparatus 200, the apparatus 100*b* can obtain a new program file to perform version-up of software or addition of new functions. Further, since the information processing apparatus 100*b* can easily obtain a file from the outside, the number of files to be stored in the file flash 11 can be reduced, and a cheaper file flash having a smaller capacity can be employed.

Furthermore, when developing a program for operating the information processing apparatus 10*b*, the program under development can be operated without being written in the file flash 11, whereby debugging of the program can be easily carried out.

Furthermore, since a program file or a data file is transferred through the file communication means 18 to the external control apparatus 200 according to a request from the external control apparatus 200, the result of self-diagnosis or the result of operation can be monitored from the outside of the information processing apparatus 10*b*.

While in this second embodiment the information processing apparatus 100*b* is connected to the external control apparatus 200 through the communication means 18, the information processing apparatus 100*b* may be connected directly to the Internet or the like through the communication means 18 to obtain more program files and data files. Further, the information processing apparatus 100*b* may be connected to the Internet or the like through the communication means 18 and the external control apparatus 200.

Embodiment 3

Next, an information processing apparatus of the third to eighth aspects will be described as a third embodiment of the invention with reference to the drawings.

Figure 27:
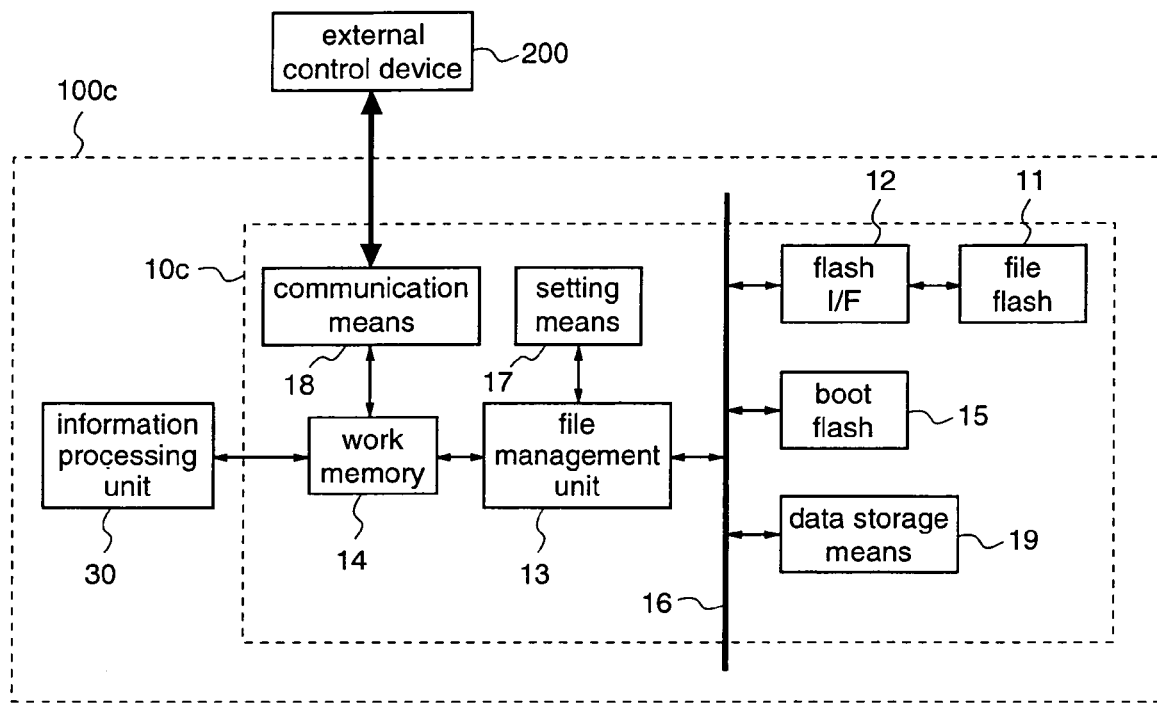
FIG. 27 is a block diagram illustrating the construction of an information processing apparatus according to a third embodiment of the present invention.
Figure 28:
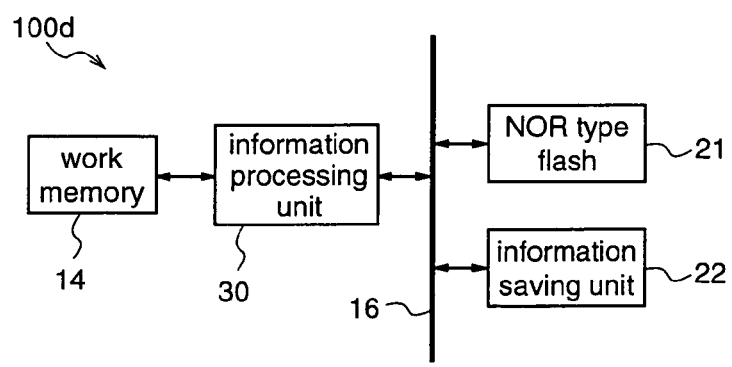
FIG. 28 is a block diagram illustrating the construction of a conventional information processing apparatus.

FIG. 27 is a block diagram illustrating the construction of an information processing apparatus according to the third embodiment of the present invention. In FIG. 27, the same reference numerals as those shown in FIG. 26 denote the same or corresponding parts, and therefore, repeated description is not necessary.

With reference to FIG. 27, a memory management apparatus 10*c* included in an information processing apparatus 100*c* according to the third embodiment is provided with a data storage means 19 in which program files such as a main program and a self-diagnostic program and data files are accumulated and stored, in addition to the memory management apparatus 10*b* of the information processing apparatus 100*b* of the second embodiment. Further, the boot flash 15 contains, in addition to the boot programs PG1~PG3 described for the second embodiment, a boot program PG4 which defines the procedure of reading the main program or the self-diagnostic program stored in the data storage means 19 into the work memory 14 after the original management information Io and the backup management information Ib are read into the work memory 14. The setting means 17 is assigned a state 4 in which the file management unit 13 executes the boot program PG4, in addition to the states 1 to 3 described for the second embodiment.

The data storage means 19 is a recording medium that can hold data after power-off, such as a DVD (Digital Versatile Disk), hard disk, CD (Compact Disc), CD-R (Compact Disc-Recordable), semiconductor memory device, or the like.

Next, the operation of the information processing apparatus 100*c* constructed as described above will be described.

When the information processing apparatus 100*c* is booted, the file management unit 13 executes any of the first boot program, second boot program, third boot program, and fourth boot program, according to the setting by the setting means 17.

When the setting by the setting means 17 is the state 1, the state 2, or the state 3, the file management unit 13 executes the boot program PG1, PG2, or PG3, respectively. Further, when the setting by the setting means 17 is the state 4, the file management unit 13 executes the boot program PG4, and reads the main program or the self-diagnostic program into the work memory 14 after reading the original management information Io and the backup management information Ib into the work memory 14.

Then, the information processing unit 30 executes the processing of the program on the work memory 14.

When a new file 5 is generated as the result of processing by the information processing unit 30, the file management unit 13 writes the file 5 into the file flash 11. This writing is carried out according to steps S2201~S2211 described for the first embodiment, that is, the file management unit 13 replaces the contents of the original management information Io of the file flash 11 with the contents of the management information Iw which describes the information of the file 5, and writes the file 5 in the file flash 11. Then, the file management unit 13 replaces the contents of the backup management information Ib with the contents of the management information Iw to end the writing of the file 5.

Further, the file management unit 13 transmits the file 5 through the communication means 18 to the external control apparatus 200 according to a request from the external control apparatus 200 or the information processing means 30.

Further, the file management unit 13 stores the file 5 in the data storage means 19 on the basis of a command from the information processing means 30.

Further, when the program on the work memory 14 is a program that defines the procedure of obtaining a program from the external control apparatus 200 or when the information processing unit 30 is instructed to obtain a program from the external control apparatus 200, the information processing unit 30 obtains a program file or a data file from the external control apparatus 200 through the communication means 18.

As described above, the information processing apparatus 100*c* according to the third embodiment of the invention is provided with the data storage means 19 for accumulating and storing data. Therefore, a self-diagnostic result file generated by executing the self-diagnostic program, a usage history and a malfunction history of the information processing apparatus 100c, and the like can be stored in the data storage means 19, and a recording medium in which the above-mentioned information is stored can be detachably used. Further, degradations in the information processing apparatus 100c and in other devices connected to the information processing apparatus 100c can be monitored using the self-diagnostic result file. Further, acquisition of various kinds of files from the outside, and execution of the main program and the self-diagnostic program can be carried out through the data storage means 19.

APPLICABILITY IN INDUSTRY

An information processing apparatus, a memory management apparatus, a memory management method, and an information processing method according to the present invention are valuable because writing and reading of data into/from a serial flash memory having a large memory capacity can be carried out without problems, and the execution time of a CPU is reduced by performing booting at power-on.

The invention claimed is:

1. An information processing apparatus having a memory management unit for managing files, and a processing unit for executing processing of a program on the basis of a program file supplied from the memory management unit, wherein
said memory management unit comprises:
a main storage means for storing the program file and various kinds of files, first management information describing information of all of the stored files, and second management information for backing up the first management information;
a boot program storage means for storing a boot program to be used at boot-up;
an auxiliary storage means for storing a supplied file;
a file management means for making access to the main storage means, the boot program storage means, and the auxiliary storage means; and
said file management means transferring, at boot-up, the first management information and the second management information to the auxiliary storage means on the basis of the boot program that is read from the boot program storage means, and transferring the file stored in the main storage means to the auxiliary storage means on the basis of the transferred first management information; and
said processing unit reads the program file transferred to the auxiliary storage means, and executing the processing of the program thereof.

2. An information processing apparatus as defined in claim 1, wherein said file management means stores a file generated in the processing apparatus into the main storage means.

3. An information processing apparatus as defined in claim 1, wherein said main storage means is a serial flash memory.

4. An information processing apparatus as defined in claim 3, wherein said main storage means comprises a serial flash memory containing the management information and various kinds of files, and at least one serial flash memory containing various kinds of files.

5. An information processing apparatus as defined in claim 3, wherein said main storage means comprises a serial flash memory containing the management information, and at least one serial flash memory containing various kinds of files.

6. An information processing apparatus as defined in claim 3, wherein said main storage means comprises plural serial flash memories each containing the management information and various kinds of files.

7. An information processing apparatus having a memory management unit for managing files, and a processing unit for executing processing of a program on the basis of a program file supplied from the memory management unit, wherein
said memory management unit comprises:
a main storage means for holding a first program file and various kinds of files, first management information describing information of all of the stored files, and second management information for backing up the first management information;
a communication means for obtaining a second program file from the outside of the apparatus;
an auxiliary storage means for storing a supplied file;
a boot program storage means for storing a boot program to be used at boot-up;
a file management means for making access to the main storage means and the auxiliary storage means;
a setting means for setting processing at boot-up;
a first transfer means for transferring the first management information and the second management information to the auxiliary storage means on the basis of the boot program that is read from the boot program storage means, and transferring the first program file stored in the main storage means to the auxiliary storage means; and
a second transfer means for transferring the first management information and the second management information to the auxiliary storage means on the basis of the boot program that is read from the boot program storage means, and transferring the second program file obtained through the communication means to the auxiliary storage means; and
said memory management unit selects, at boot-up, either the first transfer means or the second transfer means on the basis of the setting by the setting means to perform transfer of the program file to the auxiliary storage means; and
said processing unit reads the program file transferred to the auxiliary storage means, and executing the processing of the program thereof.

8. An information processing apparatus as defined in claim 7 wherein
said memory management unit further comprises:
a data storage device for accumulating and storing a third program file and data supplied thereto; and
a third transfer means for transferring the first management information and the second management information to the auxiliary storage means on the basis of the boot program read from the boot program storage means, and transferring the third program file stored in the data storage device to the auxiliary storage means; and
said memory management unit selects, at boot-up, one of the first transfer means, the second transfer means, and the third transfer means on the basis of the setting by the setting means to transfer the program file to the auxiliary storage means.

9. An information processing apparatus as defined in claim 8, wherein said file management means stores a file generated in the processing apparatus to the data storage device.

10. An information processing apparatus as defined in claim 7, wherein said processing unit obtains a file from an external apparatus through the communication means.

11. An information processing apparatus as defined in claim 7, wherein said file management means outputs a file generated in the processing apparatus to the outside through the communication means.

12. An information processing apparatus as defined in claim 7, wherein said file management means stores a file generated in the processing apparatus into the main storage means.

13. An information processing apparatus as defined in claim 7, wherein said main storage means is a serial flash memory.

14. A memory management apparatus comprising:
a main storage means for storing files, first management information in which information of all of the stored files is described and second management information which is a backup of the first management information;
a management information generation means for generating new management information for performing erasing and writing from/into the main storage means;
a first management information updating means for updating the contents of the first management information stored in the main storage means by the contents of the new management information;
a storage processing means for performing erasing and writing from/into the main storage means on the basis of the new management information; and
a second management information updating means for updating the contents of the second management information stored in the main storage means by the contents of the new management information,
wherein said main storage means has a processing state indication area indicating a processing state, and
wherein said processing state indication area comprises:
an end-of-writing indication area indicating that writing into a predetermined area has ended,
an operating state indication area indicating various kinds of states that occur during erasing or writing from/into a predetermined area, and
a disablement indication area indicating that a predetermined area cannot be used.

15. A memory management apparatus as defined in claim 14, wherein
said main storage means comprises plural blocks each comprising a predetermined number of pages, and
said end-of-writing indication area comprises:
an end-of-page-writing indication area which is provided in each page, and indicates that writing into the corresponding page has ended, and
an end-of-block-writing indication area which is provided in a predetermined page in each block, or over plural pages starting from a predetermined page, and indicates that writing into the corresponding block has ended.

16. A memory management apparatus as defined in claim 15, wherein said storage processing means overwrites an end-of-writing indication into the end-of-page-writing indication area when the writing into the page has ended, and overwrites the same into the end-of-block-writing indication area when the writing into the block has ended.

17. A memory management apparatus as defined in claim 15, wherein
the memory management apparatus further comprises a block indication value acquisition means for performing majority judgement for block-indication values in each page, which are obtained by dividing a value indicated in each page for every predetermined number of bits and assigning a binary value to each divided value, thereby to determine plural indication values as indication values as block indication values of the target block.

18. A memory management apparatus as defined in claim 14, wherein
said main storage means comprises plural blocks each comprising a predetermined number of pages; and
every time the storage processing means performs erasing or writing from/into any area, the storage processing means overwrites a state indication indicating the state of the processing, on the operation state indication area in a predetermined page in a predetermined block, or on the operation state indication areas over plural pages starting from a predetermined page in a predetermined block.

19. A memory management apparatus as defined in claim 18 wherein said state indication comprises:
a first state indication indicating that the first management information is being erased,
a second state indication indicating that the first management information is being updated,
a third state indication indicating that a new file is being written,
a fourth state indication indicating that an old file is being erased,
a fifth state indication indicating that the second management information is being erased,
a sixth state indication indicating the second management information is being updated, and
a seventh state indication indicating that all of processings have completed.

20. A memory management apparatus as defined in claim 14 wherein said operation state indication area comprises
a first state indication area indicating that the first management information is being erased,
a second state indication area indicating that the first management information is being updated,
a third state indication area indicating that a new file is being written,
a fourth state indication area indicating that an old file is being erased,
a fifth state indication area indicating that the second management information is being erased,
a sixth state indication area indicating that the second management information is being updated, and
a seventh state indication area indicating that all of processings have completed.

21. A memory management apparatus as defined in claim 14, wherein
said main storage means comprises plural blocks each comprising a predetermined number of pages, and
when a block goes into disable state, the storage processing means overwrites a disablement indication on the block disablement indication area in a predetermined page in the corresponding block, or on the block disablement indication areas over plural pages starting from a predetermined page in the corresponding block.

22. A memory management apparatus as defined in claim 14, further comprising an indication value acquisition means for dividing a value indicated in each of the processing state indication areas, for every predetermined number of bits, and assigning a binary value to each divided area by majority judgement, to obtain indication values in the respective areas.

23. A memory management apparatus as defined in claim 14, wherein said memory management apparatus further comprises an indication value acquisition means for dividing a value indicated in each of the processing state indication areas, for every predetermined number of bits, and assigning a binary value to each divided value according to whether all of the bits are in a predetermined state or not, to obtain indication values in the respective areas.

24. A memory management method for perform erasing and writing from/into a main storage means which has plural blocks containing data, and stores files, first management information in which information of all of the stored files is described, and second management information which is a backup of the first management information, said method comprising:

a management information generation step of generating new management information including information of a block into which new data is to be written and information of a block from which old data is to be erased;

a block writing step of writing the new data on the basis of the new management information;

a first management information updating step of updating the first management information stored in the main storage means by the contents of the new management information;

a second management information updating step of updating the second management information stored in the main storage means by the contents of the new management information; and a block erasing step of erasing the old data on the basis of the new management information, wherein said main storage means has a data storage area which comprises plural blocks containing data and stores files, said method further comprising:

a disablement indication step of, when a block becomes disable in the block writing step, or the file updating step, or the file writing step, overwriting a disablement indication indicating that the block is a disable block, into a predetermined area in the disable block;

a rewriting step of rewriting the contents to be written in the disable block, into an alternative block that is available in the data storage area; and a correction management information updating step of updating the first management information and the second management information which are stored in the main storage means, by the contents of correction management information including information of the disable block and the alternative block.

25. A memory management method for managing erasing of files from a main storage means which stores files, first management information in which information of all of the stored files is described, and second management information which is a backup of the first management information, said method comprising:

a management information generation step of generating new management information including information of a file to be erased;

a first management information updating step of updating the first management information stored in the main storage means by the contents of the new management information;

a file erasing step of erasing the file on the basis of the new management information; and a second management information updating step of updating the second management information stored in the main storage means by the contents of the new management information, wherein said main storage mean comprises plural blocks containing data, said method further comprising:

a disablement indication step of, when a block becomes disable in the file erasing step, overwriting a disablement indication indicating that the block is a disable block, into a predetermined area of the disable block; and a correction management information updating step of updating the first management information and the second management information stored in the main storage means by the contents of correction management information including information of the disable block.

26. A memory management method for performing erasing and writing from/into a main storage means which has plural blocks containing data, and stores files, first management information in which information of all of the stored files is described, and second management information which is a backup of the first management information, said method comprising:

a management information generation step of generating new management information including information of a block into which new data is to be written, and information of a block from which old data is to be erased;

a block writing step of writing the new data on the basis of the new management information;

a first management information updating step of updating the first management information stored in the main storage means by the contents of the new management information;

a second management information updating step of updating the second management information stored in the main storage means by the contents of the new management information; and a block erasing step of erasing the old data on the basis of the new management information, wherein said main storage means has a management information storage area which comprises plural blocks containing data, and stores first management information and second management information, said method further comprising:

a disablement indication step of, when a block becomes disable in the first management information updating step or the second management information updating step, overwriting a disablement indication indicating that the block is a disable block, into a predetermined area in the disable block; and a management information rewriting step of rewriting the new management information into an alternative block that is available in the management information storage area.

27. An information processing method employing an information processing apparatus which includes a memory management unit for managing files, and a processing unit for executing processing of a program on the basis of a program file supplied from the memory management unit, wherein said memory management unit comprises:

a main storage means for storing the program file and various kinds of files, first management information describing information of all of the stored files, and second management information for backing up the first management information;

a boot program storage means for storing a boot program to be used at boot-up;

an auxiliary storage means for storing files supplied thereto; and a file management means for making access to the main storage means, the boot program storage means, and the auxiliary storage means; and said information processing unit transfers, at boot-up, the first management information and the second management information to the auxiliary storage means on the basis of the boot program that is read from the boot program storage means by the file management means, transfers the file stored in the main storage means to the auxiliary storage means on the basis of the transferred first management information, and reads the program file transferred to the auxiliary storage means by the processing unit, and executes the processing of the program thereof.

28. A memory management method for managing erasing and writing of files from/into a main storage means which stores files, first management information in which information of all of the stored files is described, and second management information which is a backup of the first management information, said method comprising:

a management information generation step of generating new management information including information of a new file to be added and information of an old file to be erased;

a first management information updating step of updating the first management information stored in the main storage means by the contents of the new management information;

a file updating step of writing the new file on the basis of the new management information, and erasing the old file on the basis of the new management information; and a second management information updating step of updating the second management information stored in the main storage means by the contents of the new management information, wherein said main storage means has a data storage area which comprises plural blocks containing data and stores files, said method further comprising:

a disablement indication step of, when a block becomes disable in the block writing step, or the file updating step, or the file writing step, overwriting a disablement indication indicating that the block is a disable block, into a predetermined area in the disable block;

a rewriting step of rewriting the contents to be written in the disable block, into an alternative block that is available in the data storage area; and a correction management information updating step of updating the first management information and the second management information which are stored in the main storage means, by the contents of correction management information including information of the disable block and the alternative block.

29. A memory management method for managing writing of files into a main storage means which stores files, first management information in which information of all of the stored files is described, and second management information which is a backup of the first management information, said method comprising:

a management information generation step of generating new management information including information of a new file to be added;

a first management information updating step of updating the first management information stored in the main storage means by the contents of the new management information;

a file writing step of writing the file on the basis of the new management information; and a second management information updating step of updating the second management information stored in the main storage means by the contents of the new management information, wherein said main storage means has a data storage area which comprises plural blocks containing data and stores files, said method further comprising:

a disablement indication step of, when a block becomes disable in the block writing step, or the file updating step, or the file writing step, overwriting a disablement indication indicating that the block is a disable block, into a predetermined area in the disable block;

a rewriting step of rewriting the contents to be written in the disable block, into an alternative block that is available in the data storage area; and a correction management information updating step of updating the first management information and the second management information which are stored in the main storage means, by the contents of correction management information including information of the disable block and the alternative block.

30. A memory management method for managing erasing and writing of files from/into a main storage means which stores files, first management information in which information of all of the stored files is describe and second management information which is a backup of the first management information, said method comprising:

a management information generation step of generating new management information including information of a new file to be added and information of an old file to be erased;

a first management information updating step of updating the first management information stored in the main storage means by the contents of the new management information;

a file updating step of writing the new file on the basis of the new management information, and erasing the old file on the basis of the new management information; and a second management information updating step of updating the second management information stored in the main storage means by the contents of the new management information, wherein said main storage means has a management information storage area which comprises plural blocks containing data, and stores first management information and second management information, said method further comprising:

a disablement indication step of, when a block becomes disable in the first management information updating step or the second management information updating step, overwriting a disablement indication indicating that the block is a disable block, into a predetermined area in the disable block; and a management information rewriting step of rewriting the new management information into an alternative block that is available in the management information storage area.

31. A memory management method for managing writing of files into a main storage means which stores files, first management information in which information of all of the stored files is described, and second management information which is a backup of the first management information said method comprising:

a management information generation step of generating new management information including information of a new file to be added;

a first management information updating step of updating the first management information stored in the main storage means by the contents of the new management information;

a file writing step of writing the file on the basis of the new management information; and a second management information updating step of updating the second management information stored in the main storage means by the contents of the new management information, wherein said main storage means has a management information storage area which comprises plural blocks containing data, and stores first management information and second management information, said method filter comprising:

a disablement indication step of, when a block becomes disable in the first management information updating step or the second management information updating step, overwriting a disablement indication indicating that the block is a disable block, into a predetermined area in the disable block; and a management information rewriting step of rewriting the new management information into an alternative block that is available in the management information storage area.

32. A memory management method for managing erasing of files from a main storage means which stores files, first management information in which information of all of the stored files is described, and second management information which is a backup of the first management information, said method comprising:

a management information generation step of generating new management information including information of a file to be erased;

a first management information updating step of updating the first management information stored in the main storage means by the contents of the new management information;

a file erasing step of erasing the file on the basis of the new management information; and a second management information updating step of updating the second management information stored in the main storage means by the contents of the new management information, wherein said main storage means has a management information storage area which comprises plural blocks containing data, and stores first management information and second management information, said method further comprising:

a disablement indication step of, when a block becomes disable in the first management information updating step or the second management information updating step, overwriting a disablement indication indicating that the block is a disable block, into a predetermined area in the disable block; and a management information rewriting step of rewriting the new management information into an alternative block that is available in the management information storage area.

* * * * *